(12) United States Patent
Shenoy et al.

(10) Patent No.: US 12,386,881 B2
(45) Date of Patent: *Aug. 12, 2025

(54) SYNCHRONIZED SHARED PLAYLISTS

(71) Applicant: Apple Inc., Cupertino, CA (US)

(72) Inventors: Arvind S. Shenoy, San Jose, CA (US);
Thomas M. Alsina, Saratoga, CA (US);
Paul C. Irvine, Mill Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/608,122

(22) Filed: Mar. 18, 2024

(65) Prior Publication Data
US 2024/0346063 A1 Oct. 17, 2024

Related U.S. Application Data

(63) Continuation of application No. 17/706,110, filed on Mar. 28, 2022, now Pat. No. 11,934,444, which is a continuation of application No. 16/426,775, filed on May 30, 2019, now Pat. No. 11,288,304.

(60) Provisional application No. 62/679,821, filed on Jun. 3, 2018.

(51) Int. Cl.
*G06F 16/438* (2019.01)
*G06F 16/40* (2019.01)
*H04N 21/43* (2011.01)
*H04N 21/6587* (2011.01)
*H04N 21/81* (2011.01)

(52) U.S. Cl.
CPC .......... *G06F 16/4387* (2019.01); *G06F 16/40* (2019.01); *H04N 21/4305* (2013.01); *H04N 21/4307* (2013.01); *H04N 21/43076* (2020.08); *H04N 21/43079* (2020.08); *H04N 21/6587* (2013.01); *H04N 21/8106* (2013.01); *H04N 21/8113* (2013.01)

(58) Field of Classification Search
CPC ............ G06F 16/4387; H04N 21/6587; H04N 21/4307; H04N 21/4305
See application file for complete search history.

(56) References Cited

U.S. PATENT DOCUMENTS

| | | | |
|---|---|---|---|
| 8,700,714 B1 * | 4/2014 | Pan | ......................... H04L 65/60 709/206 |
| 9,680,960 B2 | 6/2017 | Chen | |
| 9,973,785 B1 | 5/2018 | Yang et al. | |
| 10,225,300 B2 | 3/2019 | Rodriguez et al. | |

(Continued)

OTHER PUBLICATIONS

International Search Report and Written Opinion for PCT Application No. PCT/US2019/034691; dated Jul. 26, 2019; 12 pgs.

*Primary Examiner* — Michael A Keller
(74) *Attorney, Agent, or Firm* — FLETCHER YODER PC

(57) ABSTRACT

The present disclosure relates to synchronized sharing of playlists from a source client device to a listening client device. To facilitate synchronized sharing, a current playlist of one or more tracks of digital content is obtained from the source client device. A current playback location within the currently playing playlist is also obtained from the source client device. A shared queue accessible by the listener client device is generated. Further, a shared queue context for the listener client device is identified based in part upon the current playback location. This enables the listener client device to start playback synchronized with the source client device.

20 Claims, 19 Drawing Sheets

(56) References Cited

U.S. PATENT DOCUMENTS

| | | | |
|---|---|---|---|
| 2010/0131558 A1* | 5/2010 | Logan | G06Q 30/00 |
| | | | 705/310 |
| 2011/0061010 A1 | 3/2011 | Wasko | |
| 2012/0117026 A1 | 5/2012 | Cassidy | |
| 2012/0290653 A1 | 11/2012 | Sharkey | |
| 2013/0218942 A1* | 8/2013 | Willis | H04L 65/1069 |
| | | | 709/201 |
| 2013/0325609 A1 | 12/2013 | Sokolov et al. | |
| 2016/0066018 A1 | 3/2016 | Chesluk et al. | |
| 2017/0273067 A1 | 9/2017 | Alsina et al. | |
| 2017/0338970 A1 | 11/2017 | Savenok et al. | |
| 2018/0039630 A1 | 2/2018 | Liao | |
| 2018/0189391 A1 | 7/2018 | Ip et al. | |
| 2018/0309844 A1 | 10/2018 | Navarro et al. | |
| 2018/0336277 A1 | 11/2018 | Alsina et al. | |
| 2019/0042648 A1 | 2/2019 | Jehan | |
| 2019/0294690 A1 | 9/2019 | Pastor et al. | |
| 2020/0351316 A1 | 11/2020 | Chen et al. | |
| 2020/0411052 A1 | 12/2020 | Manning | |

* cited by examiner

SYNCHRONIZED SHARED PLAYLISTS

CROSS REFERENCE TO RELATED APPLICATIONS

This is a continuation of U.S. application Ser. No. 17/706,110, entitled "Synchronized Shared Playlists," filed Mar. 28, 2022, which is a continuation of U.S. application Ser. No. 16/426,775, entitled "Synchronized Shared Playlists," filed May 30, 2019, which claims the benefit of U.S. Provisional Application No. 62/679,821, entitled "Synchronized Shared Playlists," filed Jun. 3, 2018, which are incorporated herein by reference in their entirety for all purposes.

BACKGROUND

The present disclosure relates generally to shared playlist generation and/or playback.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The use of digital content (e.g., music, videos, etc.) has exploded in recent years, due to the emergence of an increasing number of playback devices in the global market. Oftentimes, these devices store individual playlists of digital content that are for playback at the particular device that stores the playlist. Further, these playlists are oftentimes edited by a single user that owns the playback device. Thus, playlist generation and playback is oftentimes an individualized experience, rather than a collaborative one, despite a growing desire for a shared digital content creation and playback experience.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to shared playlist generation and synchronized playlist playback. In particular, the current embodiments relate to a cloud-based queue synchronization service that enables multiple client electronic devices to collaborate in playlist creation. Further, listening client devices can each perform synchronized playback of playlists, resulting in a more collaborative playlist creation and enjoyment experience.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

The present disclosure includes techniques for synchronized shared playlist editing and playback. More specifically, a cloud-based queue synchronization service may provide access to a queue (e.g. a playlist) of content that is accessible by multiple listening client devices. Playback of the queue at the listening devices may be synchronized, such that multiple users may experience the same digital content at the same temporal time, facilitating a collaborative enjoyment experience. Further, the cloud-based queue synchronization service may automatically update all listening clients based upon editing of the queue or queue playback by an authoritative device. For example, an authoritative device may reorder tracks in the queue, may remove and/or add tracks to the queue, may pause, seek, and/or skip during playback of the tracks, may add transitions, may over-dub tracks, etc.

Figure 1:
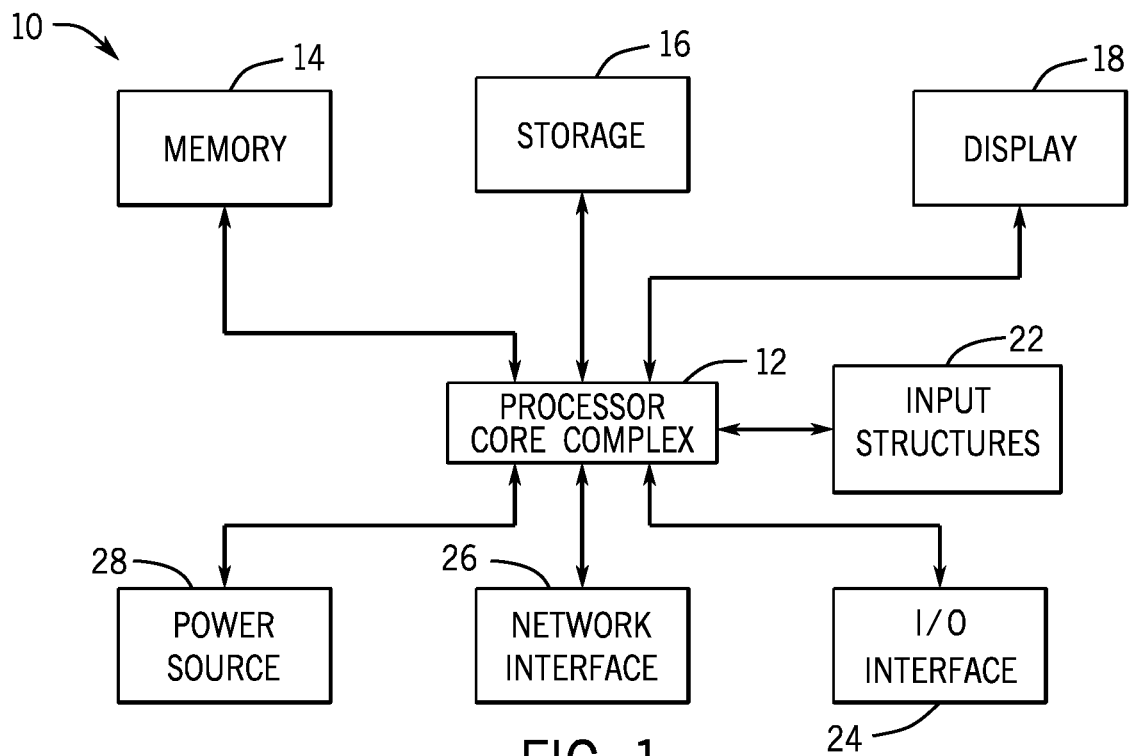
FIG. 1 is a schematic block diagram of an electronic device for implementation of synchronized shared playlist functionality, in accordance with one or more embodiments of the present disclosure.
Figure 2:
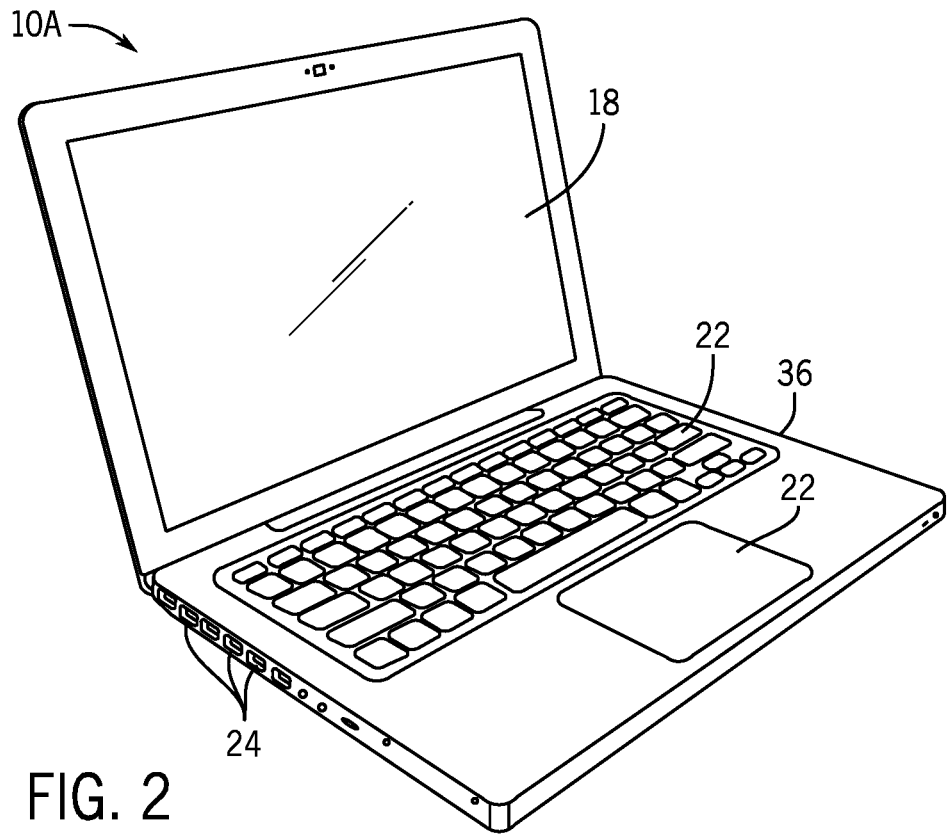
FIG. 2 is a perspective view of a notebook computer, representing an embodiment of the electronic device of FIG. 1.
Figure 4:
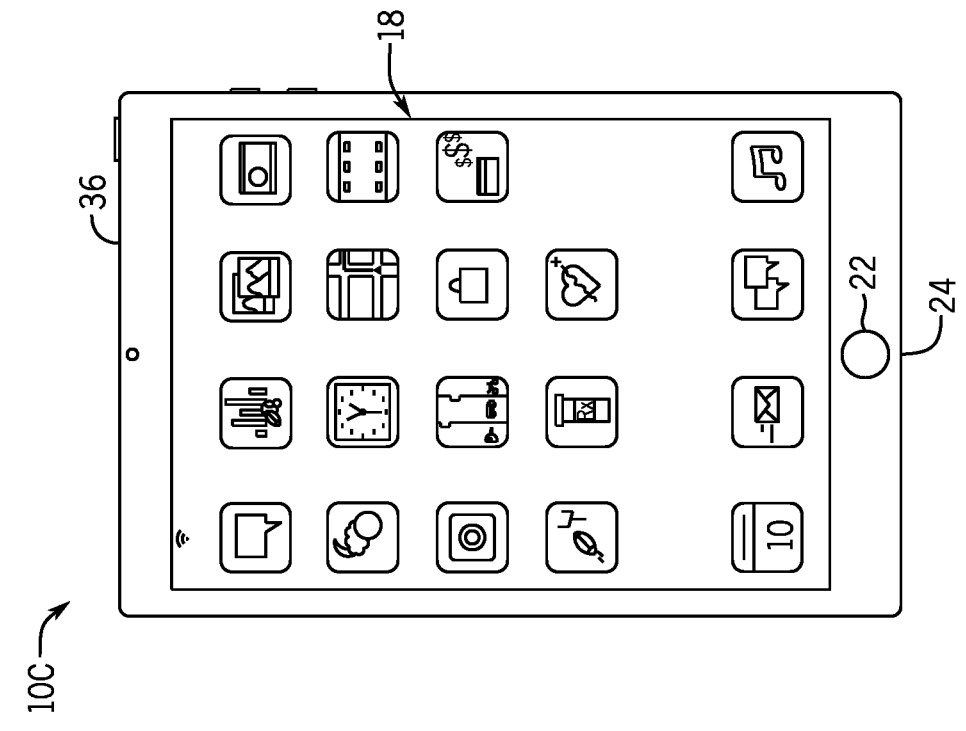
FIG. 4 is a front view of another hand-held device, representing another embodiment of the electronic device of FIG. 1.
Figure 3:
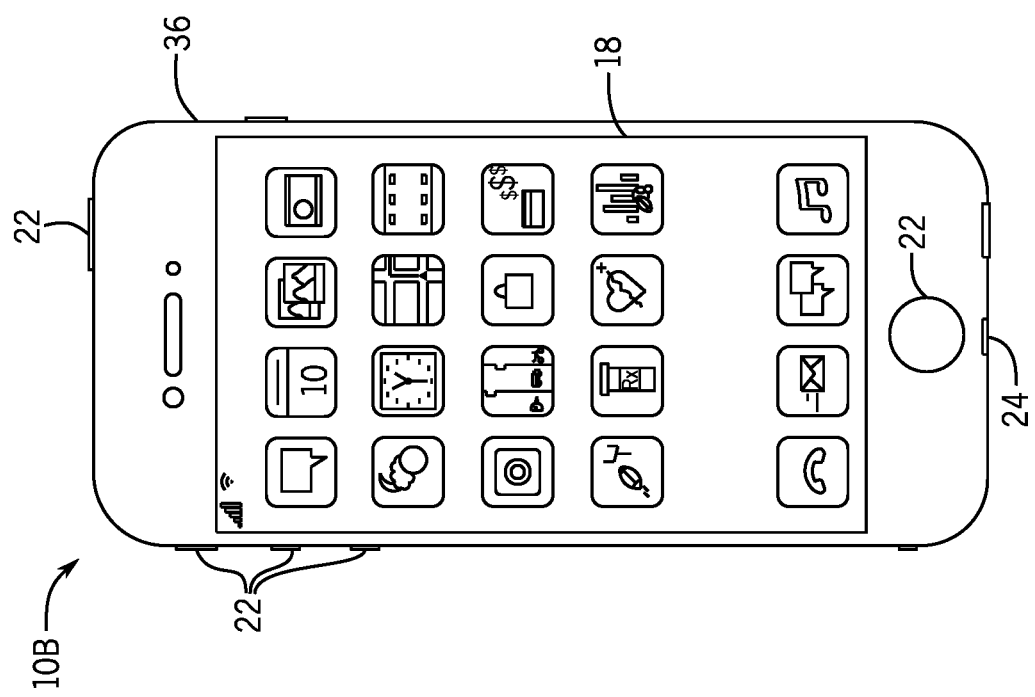
FIG. 3 is a front view of a hand-held device, representing another embodiment of the electronic device of FIG. 1.
Figure 5:
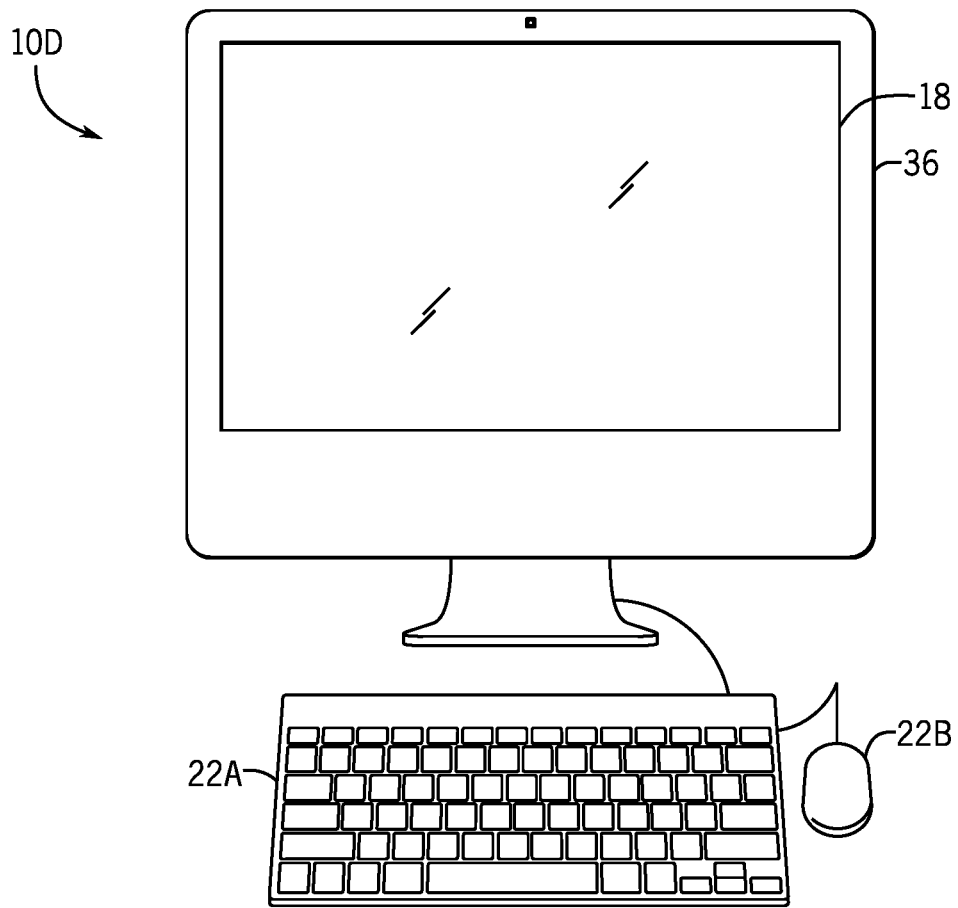
FIG. 5 is a front view of a desktop computer, representing another embodiment of the electronic device of FIG. 1.
Figure 6:
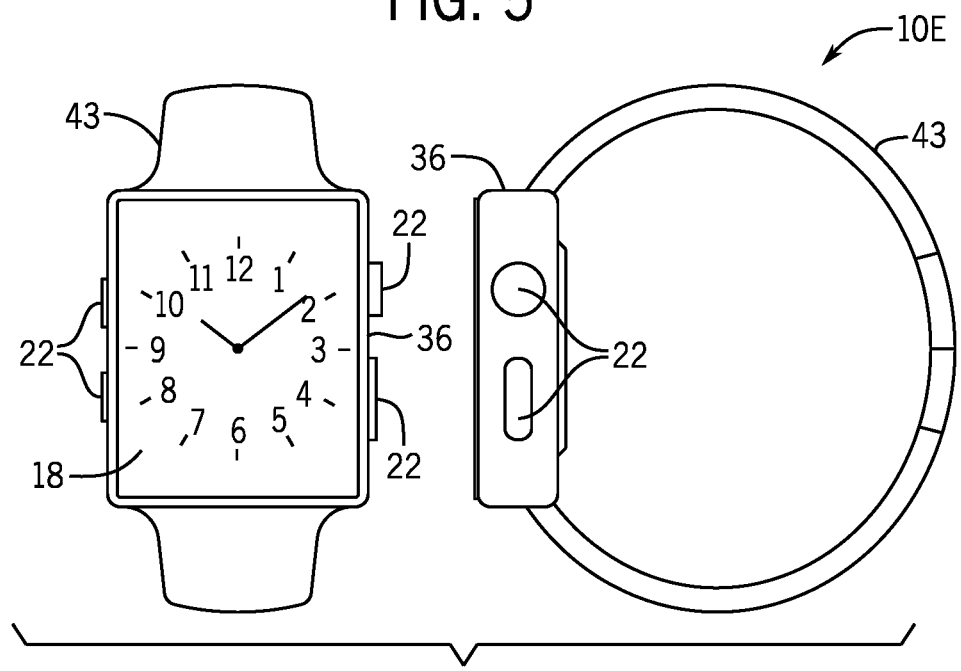
FIG. 6 is a front view and side view of a wearable electronic device, representing another embodiment of the electronic device of FIG. 1.

With this in mind, a block diagram of an electronic device 10 is shown in FIG. 1. As will be described in more detail below, the electronic device 10 may represent any suitable electronic device, such as a computer, a mobile phone, a portable media device, a tablet, a television, a virtual-reality headset, a vehicle dashboard, or the like. The electronic device 10 may represent, for example, a notebook computer 10A as depicted in FIG. 2, a handheld device 10B as depicted in FIG. 3, a handheld device 10C as depicted in FIG. 4, a desktop computer 10D as depicted in FIG. 5, a wearable electronic device 10E as depicted in FIG. 6, or a similar device.

The electronic device 10 shown in FIG. 1 may include, for example, a processor core complex 12, a local memory 14, a main memory storage device 16, an electronic display 18, input structures 22, an input/output (I/O) interface 24, a network interface 26, and a power source 28. The various functional blocks shown in FIG. 1 may include hardware elements (including circuitry), software elements (including machine-executable instructions stored on a tangible, non-transitory medium, such as the local memory 14 or the main memory storage device 16) or a combination of both hardware and software elements. It should be noted that FIG. 1 is merely one example of a particular implementation and is intended to illustrate the types of components that may be present in electronic device 10. Indeed, the various depicted components may be combined into fewer components or separated into additional components. For example, the local memory 14 and the main memory storage device 16 may be included in a single component.

The processor core complex 12 may carry out a variety of operations of the electronic device 10. The processor core complex 12 may include any suitable data processing circuitry to perform these operations, such as one or more microprocessors, one or more application specific processors (ASICs), or one or more programmable logic devices (PLDs). In some cases, the processor core complex 12 may execute programs or instructions (e.g., an operating system or application program) stored on a suitable article of manufacture, such as the local memory 14 and/or the main memory storage device 16. For example, the processor core complex 12 may carry out instructions stored in the local memory 14 and/or the main memory storage device 16 to facilitate synchronized shared playlist editing and/or playback. In addition to instructions for the processor core complex 12, the local memory 14 and/or the main memory storage device 16 may also store data to be processed by the processor core complex 12. By way of example, the local memory 14 may include random access memory (RAM) and the main memory storage device 16 may include read only memory (ROM), rewritable non-volatile memory such as flash memory, hard drives, optical discs, or the like.

The electronic display 18 may display image frames, such as a graphical user interface (GUI) for an operating system or an application interface, still images, or video content. The processor core complex 12 may supply at least some of the image frames. For example, the processor core complex 12 may supply image frames that display a donut chart and a title centered and positioned in the donut chart. The electronic display 18 may be a self-emissive display, such as an organic light emitting diodes (OLED) display, a micro-LED display, a micro-OLED type display, or a liquid crystal display (LCD) illuminated by a backlight. In some embodiments, the electronic display 18 may include a touch screen, which may allow users to interact with a user interface of the electronic device 10.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, interfaces for a personal area network (PAN), such as a Bluetooth network, for a local area network (LAN) or wireless local area network (WLAN), such as an 802.11x Wi-Fi network, and/or for a wide area network (WAN), such as a cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra wideband (UWB), alternating current (AC) power lines, and so forth. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, a smart speaker, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 according to embodiments of the present disclosure. The depicted computer 10A may include a housing or enclosure 36, an electronic display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on the electronic display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, California. The handheld device 10B may include an enclosure 36 to protect interior components from physical damage and to shield them from electromagnetic interference. The enclosure 36 may surround the electronic display 18. The I/O interfaces 24 may open through the enclosure 36 and may include, for example, an I/O port for a hard-wired connection for charging and/or content manipulation using a standard connector and protocol, such as the Lightning connector provided by Apple Inc., a universal serial bus (USB), or other similar connector and protocol.

User input structures 22, in combination with the electronic display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer or portable computing device. By way of example, the handheld device 10C may be a tablet-sized embodiment of the electronic device 10, which may be, for example, a model of an iPad® available from Apple Inc. of Cupertino, California.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the electronic display 18. In certain embodiments, a user of the computer 10D may interact with the computer 10D using various peripheral input devices, such as input structures 22A or 22B (e.g., keyboard and mouse), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple Inc. However, in other embodiments, the wearable electronic device 10E may include any wearable electronic device such as, for example, a wearable exercise monitoring device (e.g., pedometer, accelerometer, heart rate monitor), or other device by another manufacturer. The electronic display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Figure 7:
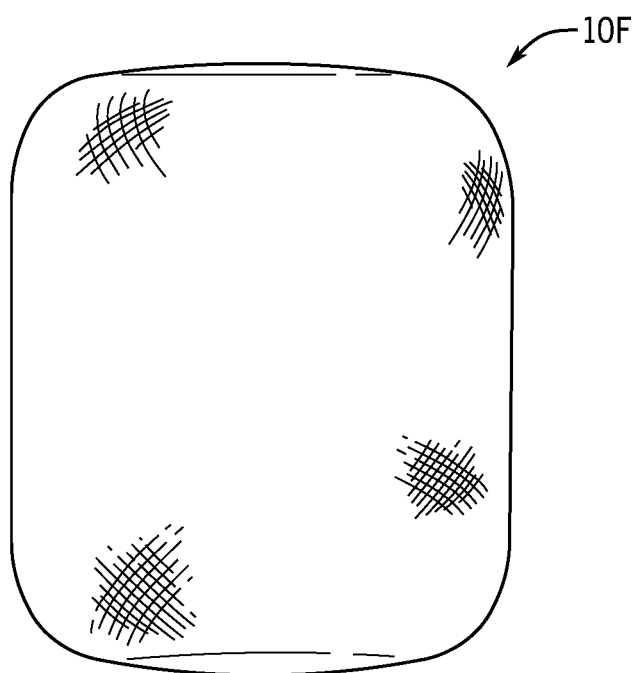
FIG. 7 is a front view of a smart speaker, representing another embodiment of the electronic device of FIG. 1.

Additionally, FIG. 7 depicts a smart speaker 10F representing another embodiment of the electronic device 10 of FIG. 1 that may be configured to operate using the techniques described herein. By way of example, the smart speaker 10F may be a HomePod™ smart speaker by Apple Inc. However, in other embodiments, the smart speaker 10F may include a speaker of another manufacturer.

Synchronized Shared Playlist Generation and Playback

Figure 8:
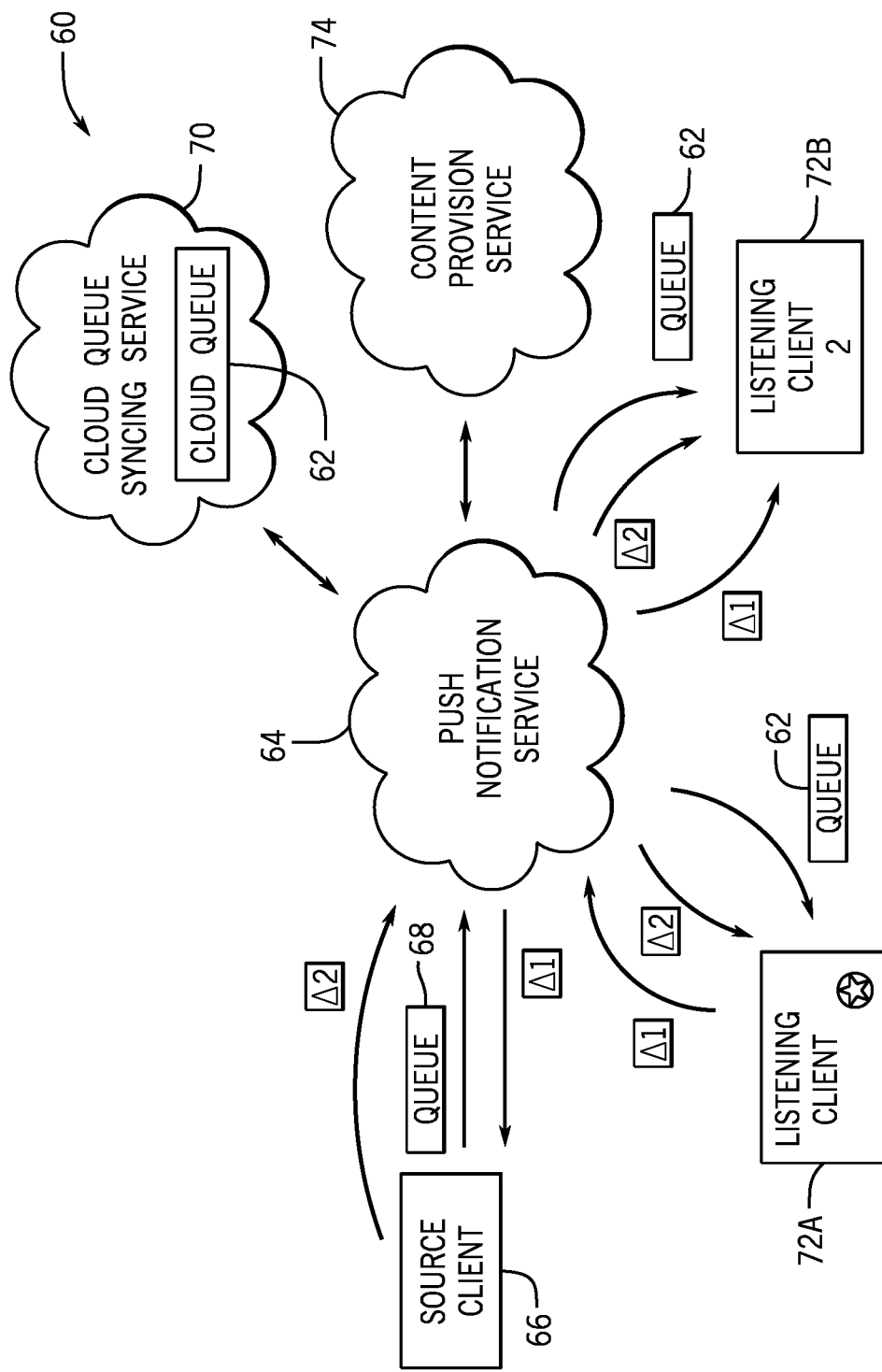
FIG. 8 is a schematic diagram of a system for implementing synchronized shared playlists, in accordance with one or more embodiments of the present disclosure.
Figure 9:
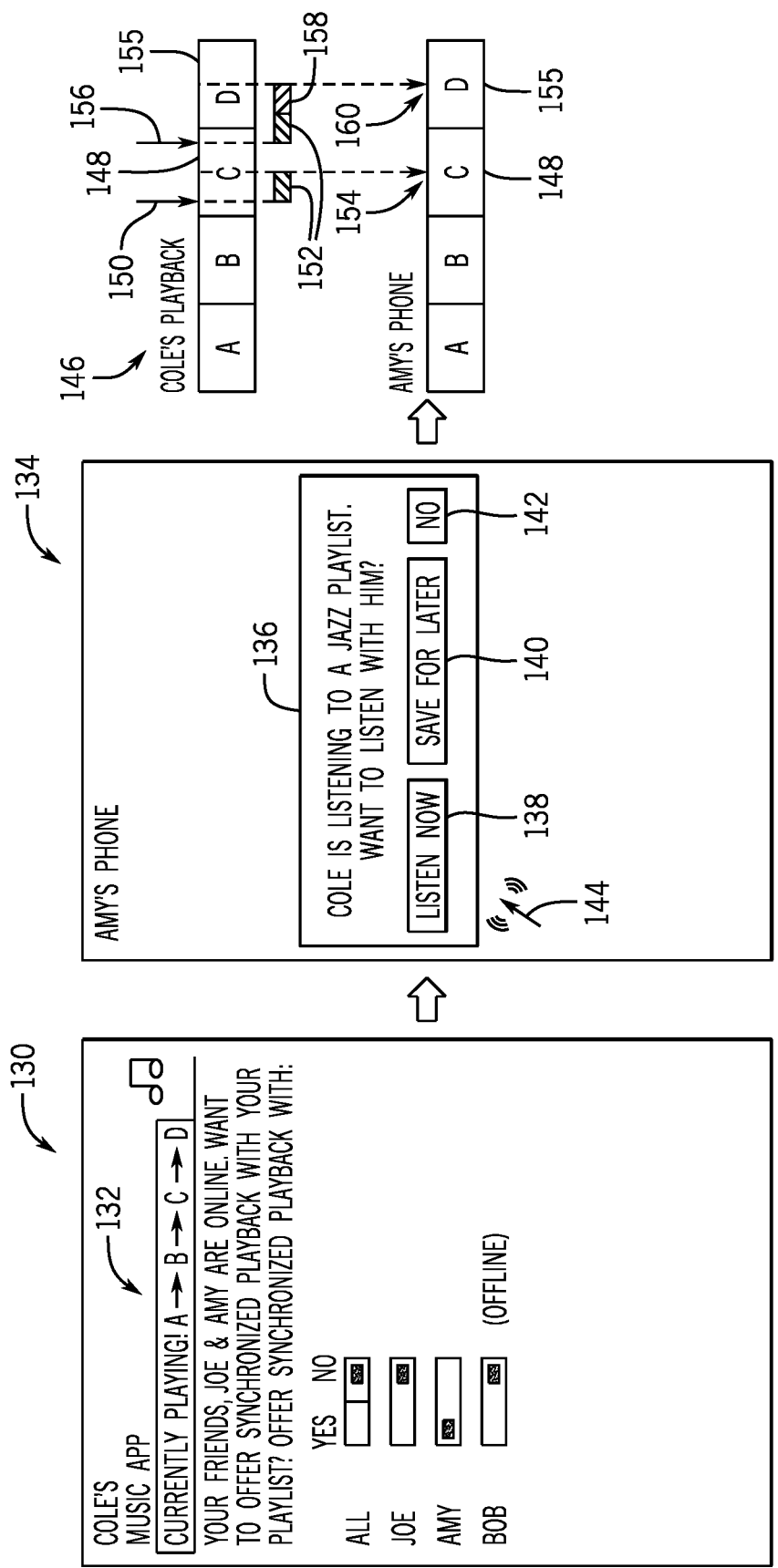
FIG. 9 is a schematic diagram of a graphical user interface (GUI) that is used to facilitate synchronized playlist sharing, in accordance with one or more embodiments of the present disclosure.
Figure 10:
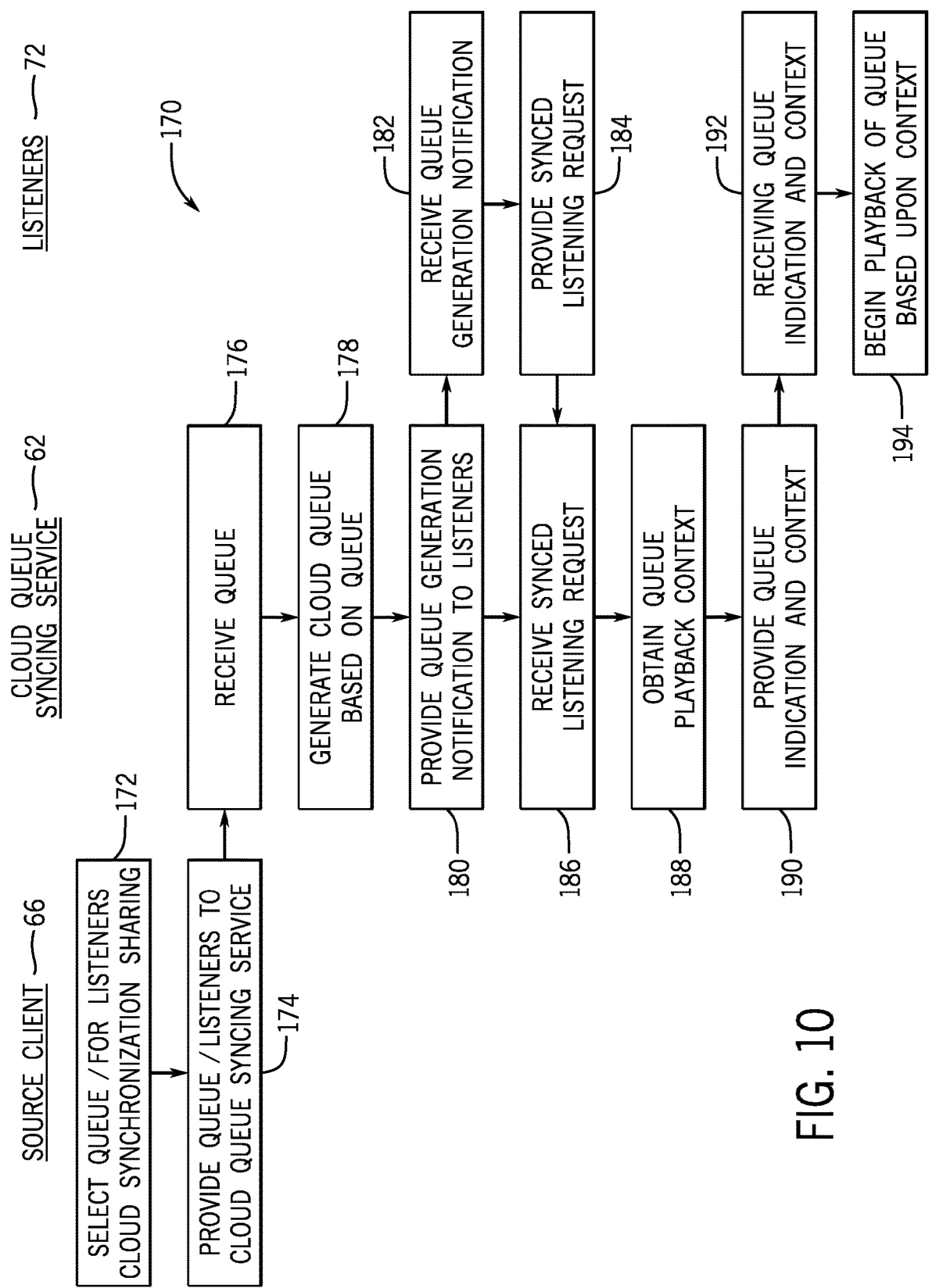
FIG. 10 is a swim lane diagram, illustrating a process for facilitating synchronized playlist sharing, in accordance with one or more embodiments of the present disclosure.

The discussion now turns to an overview of synchronized shared playlist playback. FIG. 8 is a schematic diagram of a system 60 for implementing synchronized shared playlists, in accordance with one or more embodiments of the present disclosure. FIG. 9 is a schematic diagram of a graphical user interface (GUI) that is used to facilitate synchronized playlist sharing, in accordance with one or more embodiments of the present disclosure. FIG. 10 is a swim lane diagram, illustrating a process 170 for facilitating synchronized playlist sharing, in accordance with one or more embodiments of the present disclosure. For clarity, these figures will be discussed together.

As previously discussed, the system 60 includes a cloud-based queue syncing service 62 for facilitating provisioning, editing, and synchronization of synchronized shared playlists. As illustrated, in some embodiments, a push notification service 64, such as Apple Push Notification Service (APNS) may act as an intermediate communications between clients and the cloud-based queue synchronization service 62. The push notification service 64 may maintain an open communications connection with client devices, facilitating a multitude of push-notification services for various applications of the client devices.

To initiate synchronized shared playlist playback, a source client 66 provides a queue 68 to the cloud-based queue synchronization service 62 (e.g., via the push notification service 64). The queue 68 may be a stream of digital content (e.g., from a broadcast content provider), an algorithmically selected list of digital content in a particular order (e.g., a station of tracks based on a specific song or artist), and/or a manually selected list of tracks of digital content in a particular order. As illustrated in FIG. 10, the source client 66 may select a queue 68 and listeners for synchronized sharing (block 172). An example graphical user interface (GUI) 130 for selection of listeners that will be allowed to listen to the currently playing playlist 132 is provided in FIG. 9. In the current example, Amy is the only selected user who has been allowed playback of Cole's currently playing playlist 132. Upon selecting one or more allowed listeners (e.g., devices or users), the queue 68 (e.g., the currently playing playlist 132) and listeners (e.g., Amy, in the current example) are provided to the cloud-based queue synchronization service 62 (block 174). In some embodiments, additional criteria for allowed listeners may be set. For example, a sharing duration may limit allowed listening to a particular duration of time (e.g., 1 hour, 1 day, 1 week, etc.) or until a particular date (e.g., May 20th). When additional criteria is set, it may be sent to the cloud-based queue synchronization service 62 for criteria-based sharing of the synchronized shared playlist.

The cloud-based queue synchronization service 62 receives (block 176) the queue 68 and generates (block 178) a cloud-based queue 70, which may be stored at the system 60 (e.g., the cloud-based queue synchronization service) or may be pushed to listening client devices (e.g., listening client devices 72A and 72B). For example, the received queue 68 may be transformed into a data structure used by the cloud-based queue synchronization service 62. In one embodiment, the data structure may include a list of dictionaries (e.g., tracks), a play context (e.g., a current playback position of the source client 66 in the queue), a version of the queue (e.g., a unique identifier associated with the queue that identifies the queue), change sets (e.g., modifications made from a previous version of the queue), listeners of the queue (e.g., media access control (mac) addresses, IP addresses, or other identifiers associated with the listening clients), an owner (e.g., mac addresses, IP addresses, or other identifiers associated with an owner (e.g., the source client 66)), and administrators (e.g., mac addresses, IP addresses, or other identifiers associated with the administrator clients that are permitted to edit the queue).

Once the cloud-based queue 70 is generated, a queue generation notification is provided to the listeners (e.g., defined in the data structure of the queue 70) (block 180). For example, as illustrated in the GUI 134 of FIG. 9, a push notification 136 is provided to Amy's phone, based upon the selections made by Cole in GUI 130. The push notification 136 is received (block 182) by the listening device 72. In the current embodiment of FIG. 9, the push notification 136 provides three options, a "listen now" option 138, a "save for later option" 140 and a "no" option 142. The "listen now" option 138, when selected, indicates a desire to playback a synchronized shared playlist. The "save for later" option 140, when selected, indicates that a reference to the synchronized shared playlist should be saved for historical playback of the synchronized shared playlist, as will be discussed in more detail below. The "no" option 142, when selected, indicates that no synchronized shared playlist playback is currently desired.

In the current example, Amy selects the "listen now" option 138, as indicated by pointer 144. This results in provision of synchronized listening request (block 184) by the listening client 72 (e.g., Amy's phone) to the cloud-based queue synchronization service 62. The synchronized listening request is received at the cloud-based queue synchronization service 62 (block 186) and a queue context is obtained (block 188) for provision with the queue indication to the listening client device 72 (block 190). The queue context and queue indication (e.g., the tracks associated with the queue) are received by the listening client devices 72 (block 192).

Figure 11:
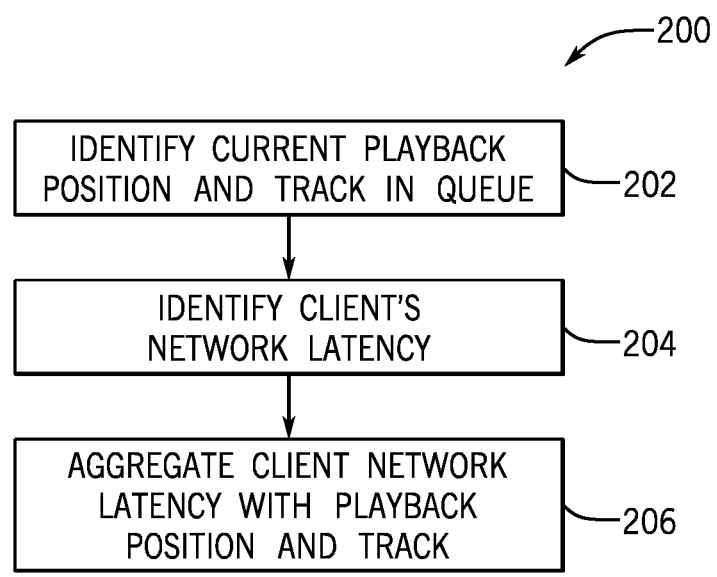
FIG. 11 is a flowchart for calculating a queue playback context, in accordance with one or more embodiments of the present disclosure.

The queue context is a time adjustment specific to a particular listener client device 72 that will enable the listener client device 72 to playback content at a common location in the queue with another device (block 194). FIG. 11 is a flowchart, illustrating a process 200 for calculating a queue playback context, in accordance with one or more embodiments of the present disclosure. First, a current playback position and track of a client device that the listener client device 72 is to synchronize with is determined (block 202). For example, Cole's playback 146 in FIG. 9 illustrates a playback in Track C 148 at time 150.

Network latency between providing an indication of the playback position and track of the client device to be synchronized with may result in a skewed synchronization, where the synchronization is off by the network latency. In some embodiments, a content provisioning service 74 may supply the content indicated in the playlist. Accordingly, the network latency between the cloud-based queue synchronization service 62, the content provisioning system, and/or the listener client device 72 may be identified (block 204). The network latency and the playback position & track may be aggregated, such that any synchronization skew caused by the network latency may be removed. For example, as depicted in FIG. 9, playback at Amy's phone is started at an aggregation of time 150 added to a network latency amount of time 152, resulting in a skew-adjusted playback time 154.

In some embodiments, the synchronization may result in a context that extends into a subsequent track. This may especially occur when the context indicates high network latency and/or the playback position is near the end of a track. For example, returning to FIG. 9, if Cole's playback was at time 156 of Track C 148 (e.g., near the end of Track C 148), the queue playback context may need to carry over to the subsequent track (e.g., Track D 155). In such a scenario, additional time may be aggregated to the queue playback context to account for other potentially skewing factors. For example, time amount 158 relates to a fetch and load time for loading and beginning playback of Track D 155 on Cole's playback device. By accounting for the fetch and load time at Cole's playback device, a more accurate synchronization may occur. Accordingly, the time amount 158 may be aggregated into the queue playback context (block 206), resulting in playback at Amy's phone at time 160.

Synchronized Shared Playlist Modification

Figure 12A:
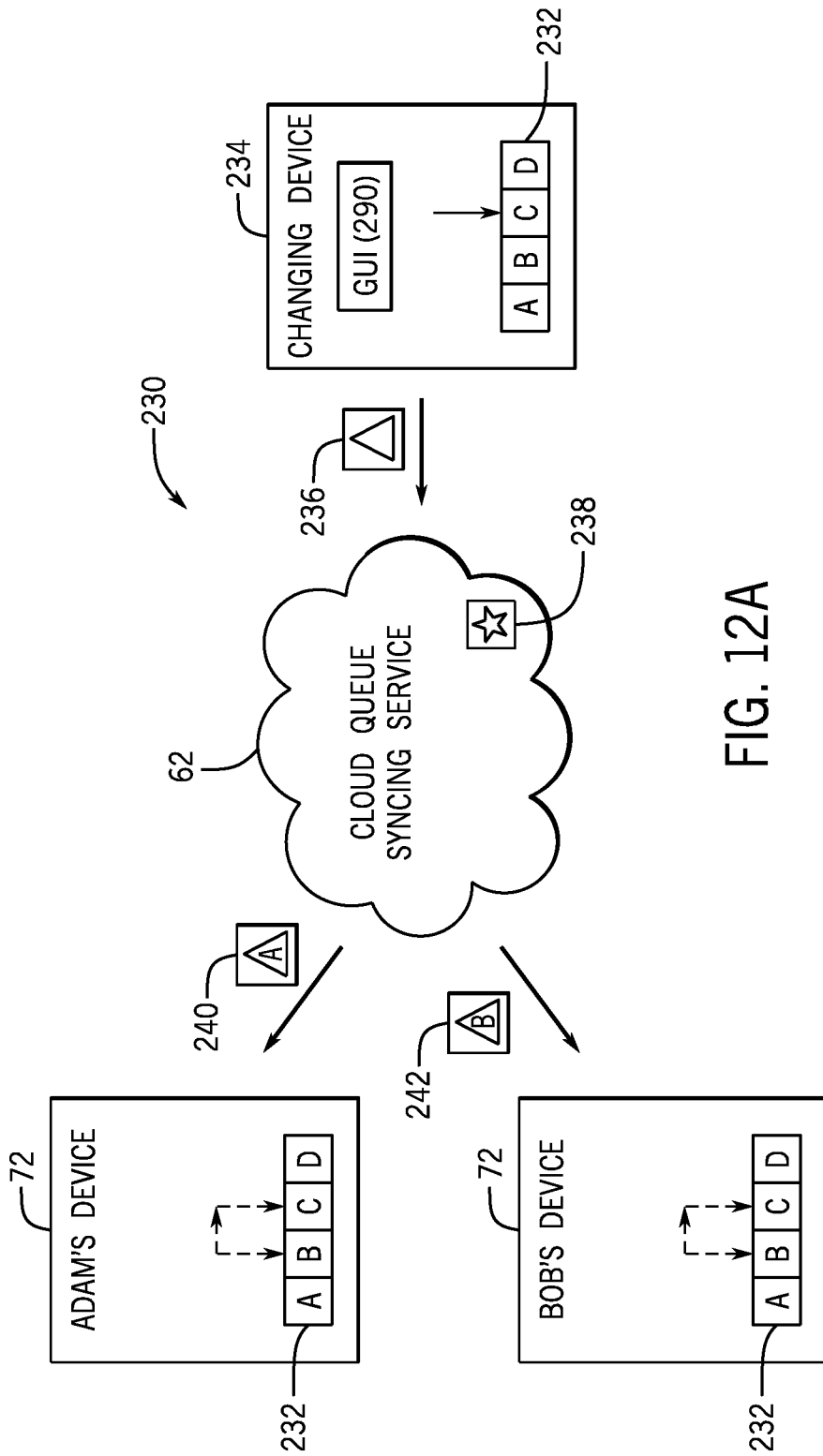
FIGS. 12A and 12B are schematic diagrams illustrating alternative approaches to implementing shared playlist changes, in accordance with one or more embodiments of the present disclosure.
Figure 12B:
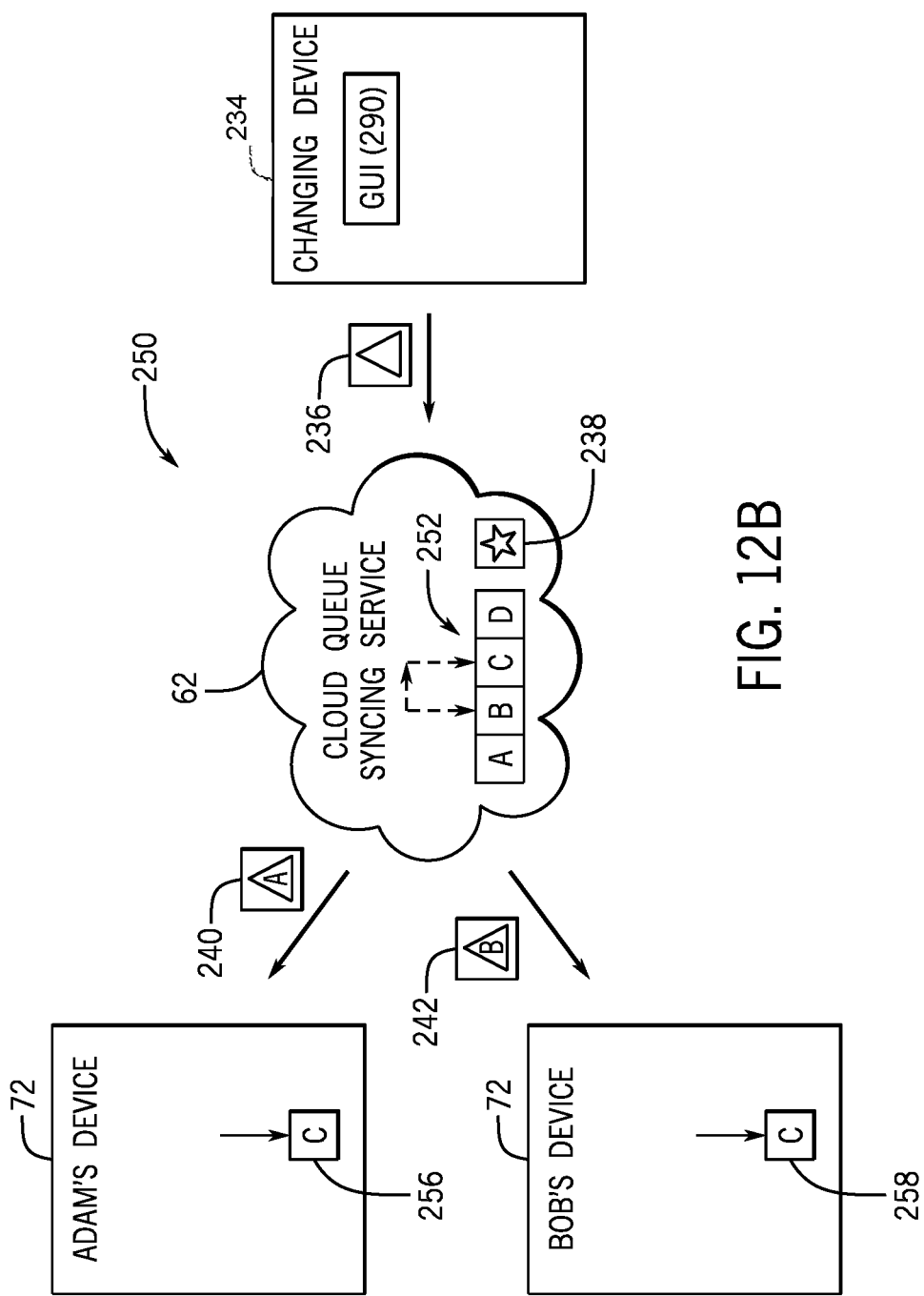
Figure 13:
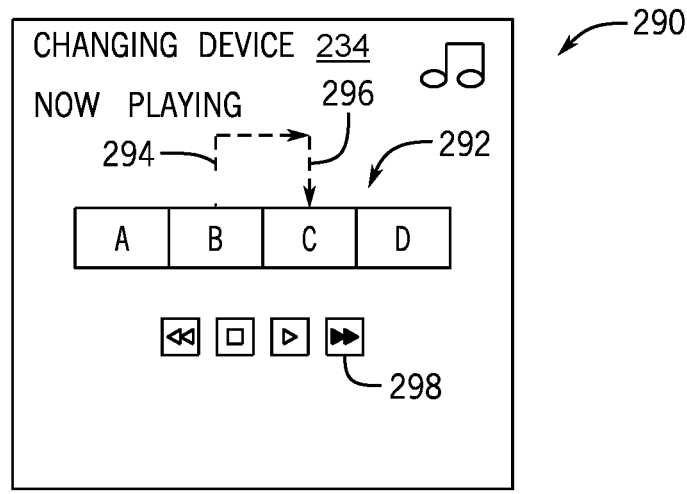
FIG. 13 is a schematic diagram of a graphical user interface (GUI) for changing a synchronized playlist, in accordance with one or more embodiments of the present disclosure.
Figure 14:
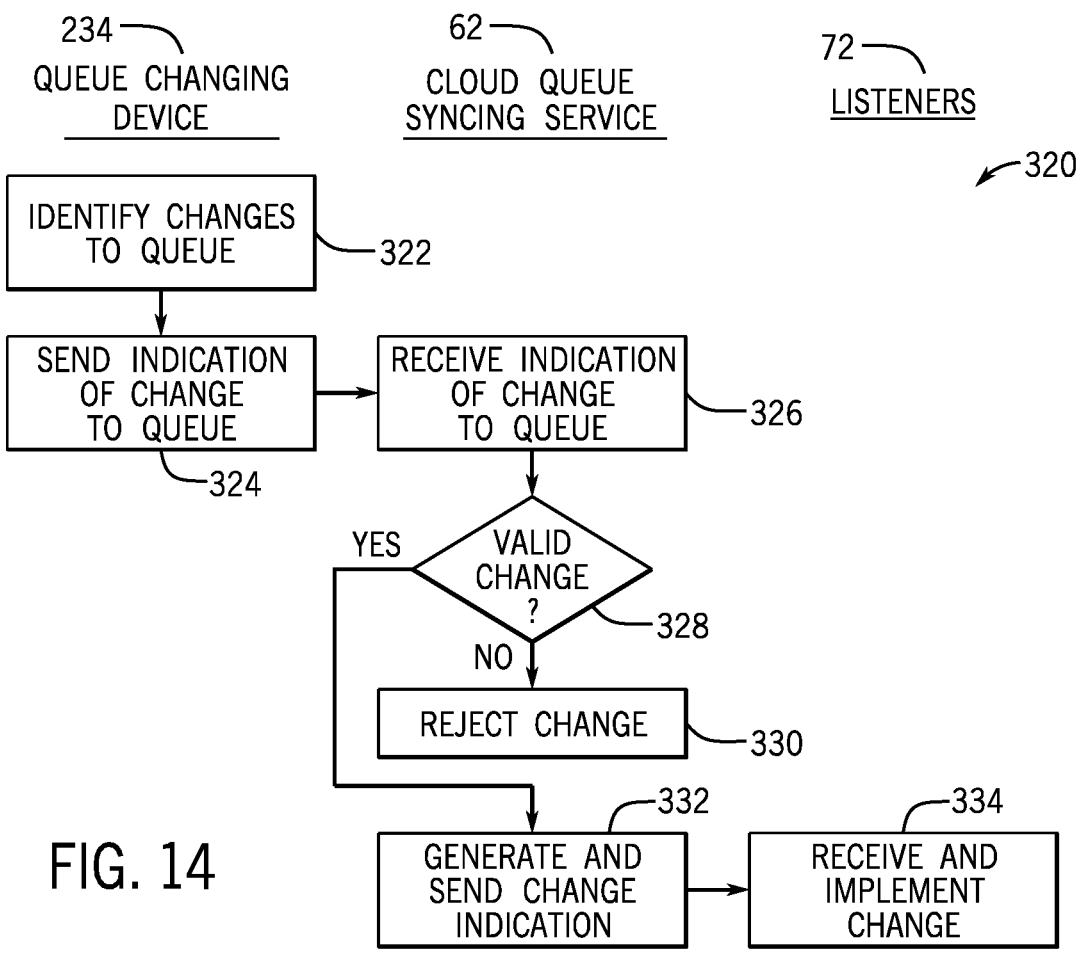
FIG. 14 is a swim lane diagram, illustrating a process for facilitating changes to synchronized shared playlists, in accordance with one or more embodiments of the present disclosure.

Having discussed generation and synchronization of playback, the discussion now turns to facilitating changes in the shared playlists. FIGS. 12A and 12B are schematic diagrams illustrating systems 230 and 250 that use alternative approaches to implement shared playlist changes, in accordance with one or more embodiments of the present disclosure. The system 230 of FIG. 12A uses localized queues 232 stored on each of client devices (e.g., listening client devices 72 and changing client device 234) to facilitate changes in synchronized shared playlists. The system 250 of FIG. 12B utilizes a centralized cloud queue 252 that is stored in the cloud-based queue synchronization service 62. Further, FIG. 13 illustrates a graphical user interface (GUI) 290 for triggering playlist modifications/changes. FIG. 14 is a swim lane diagram, illustrating a process 320 for synchronizing changes to shared playlists, in accordance with one or more embodiments of the present disclosure. For clarity, these figures will be discussed together.

As indicated by the process 320, a change to the synchronized shared playlist (e.g., queue) and/or a current playback time is identified (block 322). For example, the GUI 290 of FIG. 13 may be used to modify a playlist 292 and/or a current playback time on a changing device 234. Example modifications include: adding and/or removing tracks, reordering tracks, modifying playback time (e.g., via skip, seek, pause, 2× play speed, etc.), adding transitions or other media, and/or overdubbing one or more tracks. In the example of FIG. 13, playback time skips from time 294 to time 296 based upon a seek selection 298. This modification to the queue (e.g., here, a change in playback time) may be communicated by the GUI 290 to one or more processors of the queue changing device 234, where the change is identified in block 322. For example, returning to FIGS. 12A and 12B, the changing device 234 modifies the queue (either the localized queue 232 or the cloud-based queue 252), for example, using GUI 290.

Next, an indication of the change to the queue is provided to the cloud-based queue synchronization service 62 (block 324). For example, in FIGS. 12A and 12B, the changing device 234 sends a change 236 to the cloud-based queue synchronization service 62. The cloud-based queue synchronization service 62 receives the indication of the change to the queue (block 326) and confirms whether or not the change is valid (decision block 328). For example, the cloud-based queue synchronization service 62 may determine whether permissions for the queue changing device 234 or a user associated with the queue changing device 234 exist with the cloud-based queue. As mentioned above, the data structure maintaining the cloud-based queue may include this permission data. If the change is not valid (e.g., no permission for the change exists), the change is rejected by the cloud-based queue synchronization system 62 (block 330). However, when the change is valid, a change indication notification may be generated and sent to listener client devices 72 (block 332).

In FIGS. 12A and 12B, independent credentials 238 stored in the cloud-based queue synchronization service 62 and queue-stored credentials 254, each respectively include a permission allowing changing device 234 to edit the synchronized shared playlist. Accordingly, the cloud-based queue synchronization service 62 generates and sends a customized change indication to the listening client device 72 (block 332). For example, change 240 is particular to Adam's Device and change 242 is particular to Bob's Device, taking into account variations between the listening devices 72, such as network latency, etc.

The changes 240 and 242 are then received and implemented by their respective listing client devices 72. This results in a change to the playlist synchronization. For example, in FIG. 12A, the localized queue 232 for each of the changed listening client devices 72 is advanced to the location change triggered on the GUI 290 of the changing device 234. Similarly, in FIG. 12B, an updated local track and track position 256 and 258 are played back on respective listening client devices 72.

Spanned Service Architecture

Figure 15:
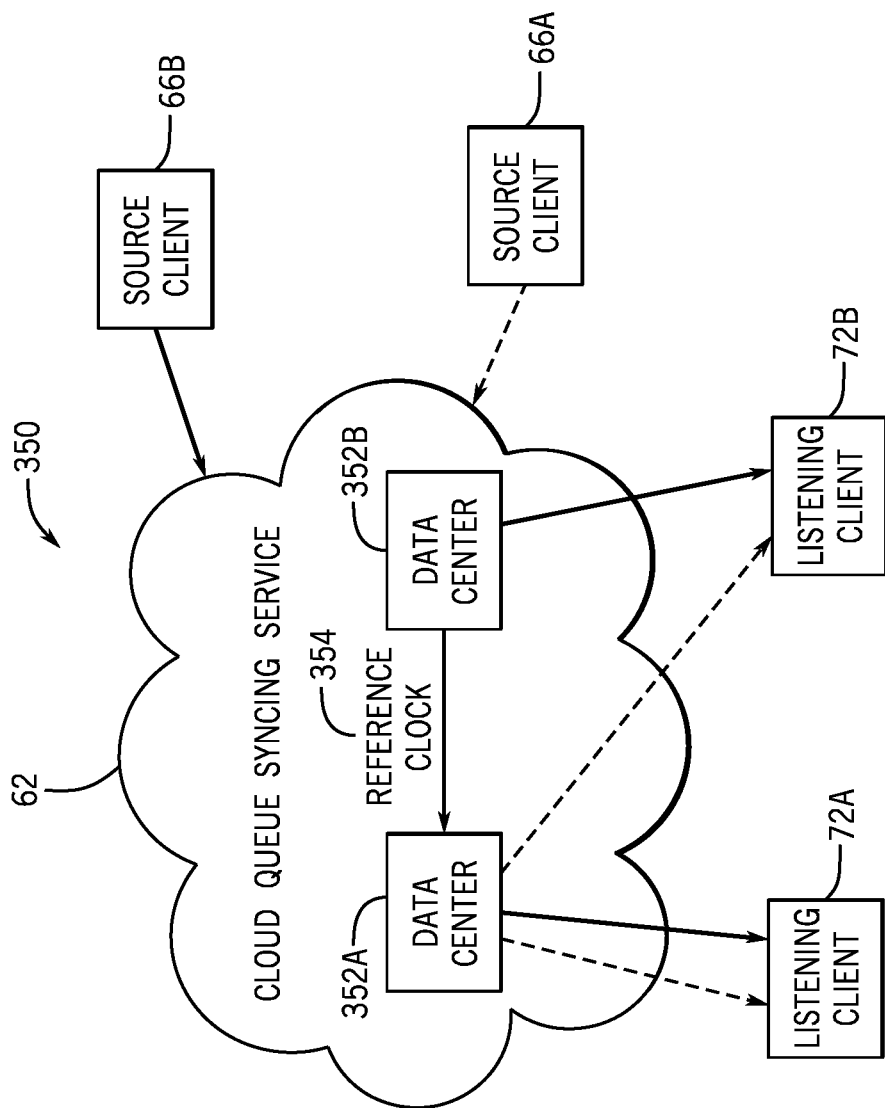
FIG. 15 is a schematic diagram of a cloud-based queue synchronization service that spans multiple data centers, in accordance with one or more embodiments of the present disclosure.
Figure 16A:
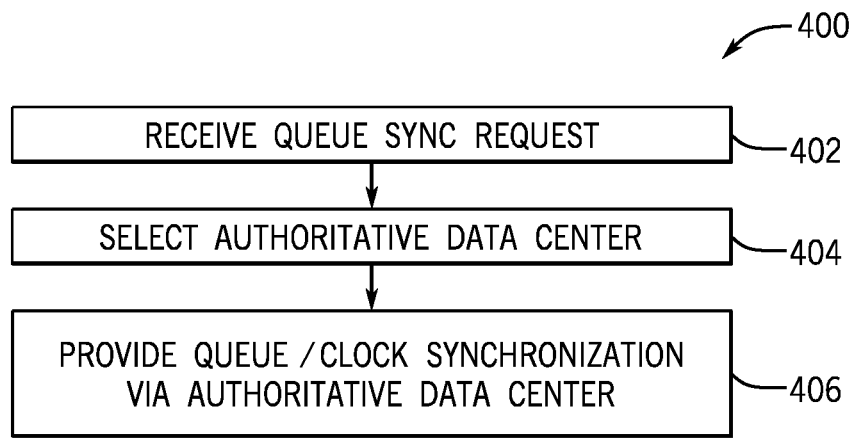
FIGS. 16A and 16B are flowcharts, illustrating processes for providing synchronized shared playlist playback and editing using multiple data centers, in accordance with one or more embodiments of the present disclosure.

As may be appreciated, many devices may use the cloud-based queue synchronization service 62. Accordingly, to service requests, the cloud-based queue synchronization service 62 may span multiple data centers and/or data center servers. FIG. 15 is a schematic diagram of a system 350 where the cloud-based queue synchronization service 62 spans multiple data centers (e.g., Data Center 352A and Data Center 352B), in accordance with one or more embodiments of the present disclosure. Further, FIGS. 16A and 21B are flowcharts, illustrating processes 400 and 420, respectively, for providing synchronized shared playlist playback and editing using multiple data centers, in accordance with one or more embodiments of the present disclosure. For clarity, these figures will be discussed together.

As illustrated in FIG. 15, the cloud-based synchronization service 62 services synchronized playlists from two data centers 352A and 352B. However, if not accounted for, clock differences between servers in these two data centers 352A and 352B may cause erroneous synchronization. For example, if source client 66A initiates generation of a synchronized shared playlist via data center 352B, but the cloud-based queue synchronization service 62 serves playlist updates and clock synchronization using data center 352A, a clock mismatch between data centers 352A and 352B may result in mis-synchronization, as the queue context of the source client 66B may be in reference to a clock of data center 352B, while the queue contexts provided to listening clients 72A and 72B may be in reference to a clock of data center 352A.

Figure 16B:
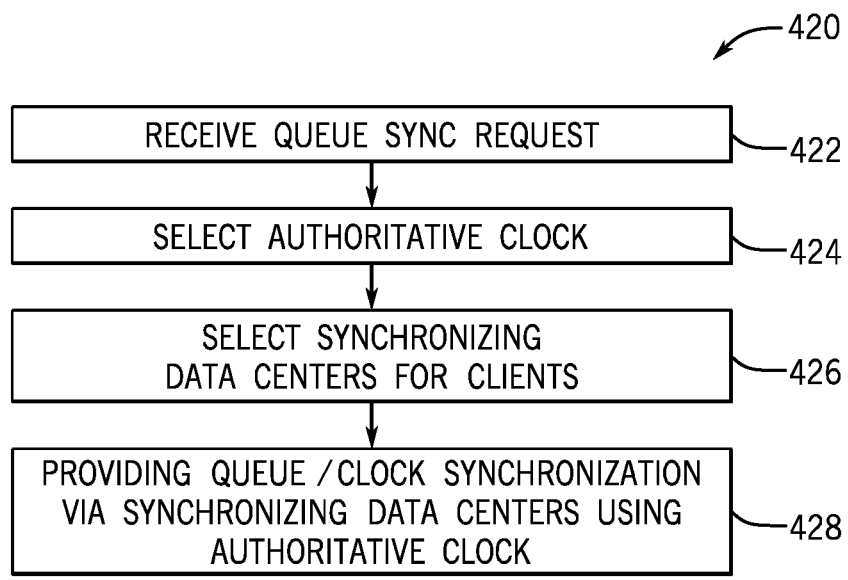

Accordingly, processes 400 and/or 420, of FIGS. 16A and 16B, respectively, may be implemented to ensure proper synchronization in a spanned computing environment. Starting first with process 400, the process 400 solves potential synchronization mismatches by maintaining one data center to facilitate service requests. The process 400 begins with receiving a queue synchronization request (block 402). For example, this could occur when a source client (e.g., source client 66A) requests generation of a synchronized shared playlist or when a listening client (e.g., listening client 72A) requests a synchronize shared playlist.

An authoritative data center is selected (block 404). The authoritative data center is the data center that will service all requests for a particular synchronized shared playlist. The authoritative data center may be selected based upon a number of factors. For example, the authoritative data center may be selected based upon which data center first receives a request associated with the playlist. In some embodiments, the authoritative data center may be selected based upon a geographical proximity with the source client 66 and/or the listening clients 72. In some embodiments, the authoritative data center may be selected based upon load balancing, such that the load of service is distributed amongst the data centers.

For any synchronization actions, the cloud-based queue synchronization service 62 will provide queue and clock synchronization data by the particular authoritative data center associated with the particular playlist (block 406). By using a single data center to service requests for a particular synchronized shared playlist, synchronization integrity may be maintained.

Referring back to FIG. 15, the synchronized shared playlist sourced from source client 66A implements the process 400 to maintain synchronization integrity. The broken arrows illustrate the data flow used to facilitate this synchronized shared playlist. In this example, source client 66A provides the shared playlist to the cloud-based queue synchronization service 62, triggering a synchronization. In this example data center 352A is selected as the authoritative data center. Accordingly, data center 352A services synchronization of the shared playlist from source client 66A to both listening client device 72A and listening client device 72B.

Process 420 of FIG. 16B provides an alternative approach to maintaining synchronization integrity in a spanned service architecture. In process 420, there is an authoritative reference clock that is used for particular playlists. First, a queue synchronization request is received, similar to process 400 (block 422). Next, an authoritative clock is selected (block 424). The authoritative clock is a clock that will be the reference for all synchronization services for a particular playlist. A signal indicating the selected authoritative clock may be provided to each data center that will service synchronization requests, enabling these data centers to service the requests using the authoritative clock.

One benefit of process 420 over process 400 is that different data centers can be used to service different listening client devices 72, despite a common authoritative clock being used for all synchronization requests for a particular playlist. Accordingly, particular synchronizing data centers are selected to service listening client devices 72 (block 426).

The selected data centers may then service synchronization requests of assigned listening client devices using the authoritative clock. For example, the queue context may be calculated using the authoritative clock indication (block 428).

Referring back to FIG. 15, the synchronized shared playlist sourced from source client 66B implements the process 420 to maintain synchronization integrity. The solid arrows illustrate the data flow used to facilitate this synchronized shared playlist. In this example, source client 66B provides that shared playlist to the cloud-based queue synchronization service 62, triggering a synchronization. In this example, the clock of data center 352B is chosen as the authoritative clock and an indication 354 of the authoritative clock is provided to the other data centers (e.g., data center 352A) that will provide synchronization services using the authoritative clock. After providing the indication 354, a number of data centers can service requests using the same authoritative clock. For example, data center 352A services requests to listening client device 72A using the authoritative clock and data center 352B services requests to listening client device 72B using the authoritative clock.

Gap-Filling Playlists

Figure 17:
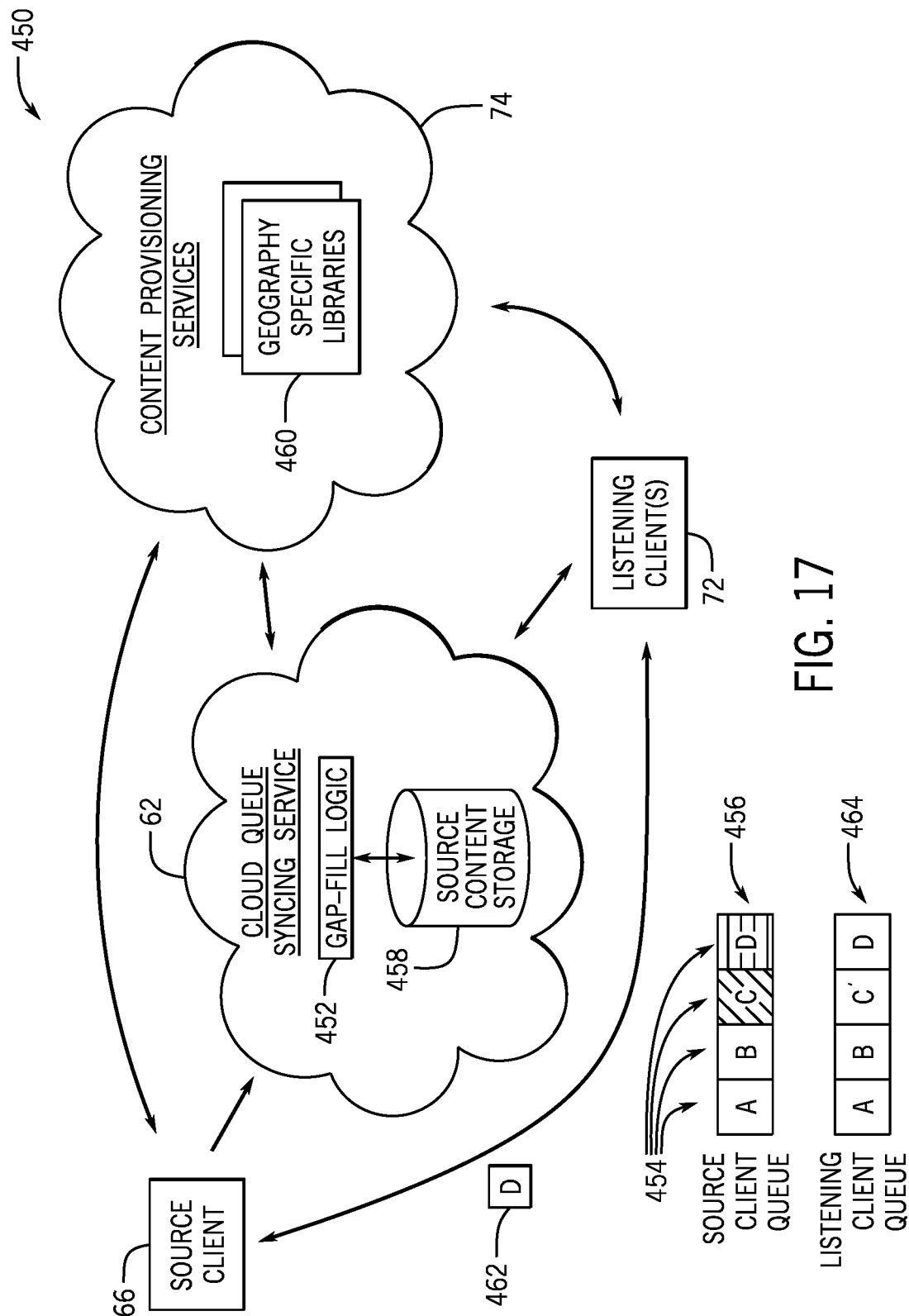
FIG. 17 is a schematic diagram of a cloud-based queue synchronization service that includes gap-filling logic, in accordance with one or more embodiments of the present disclosure.
Figure 18:
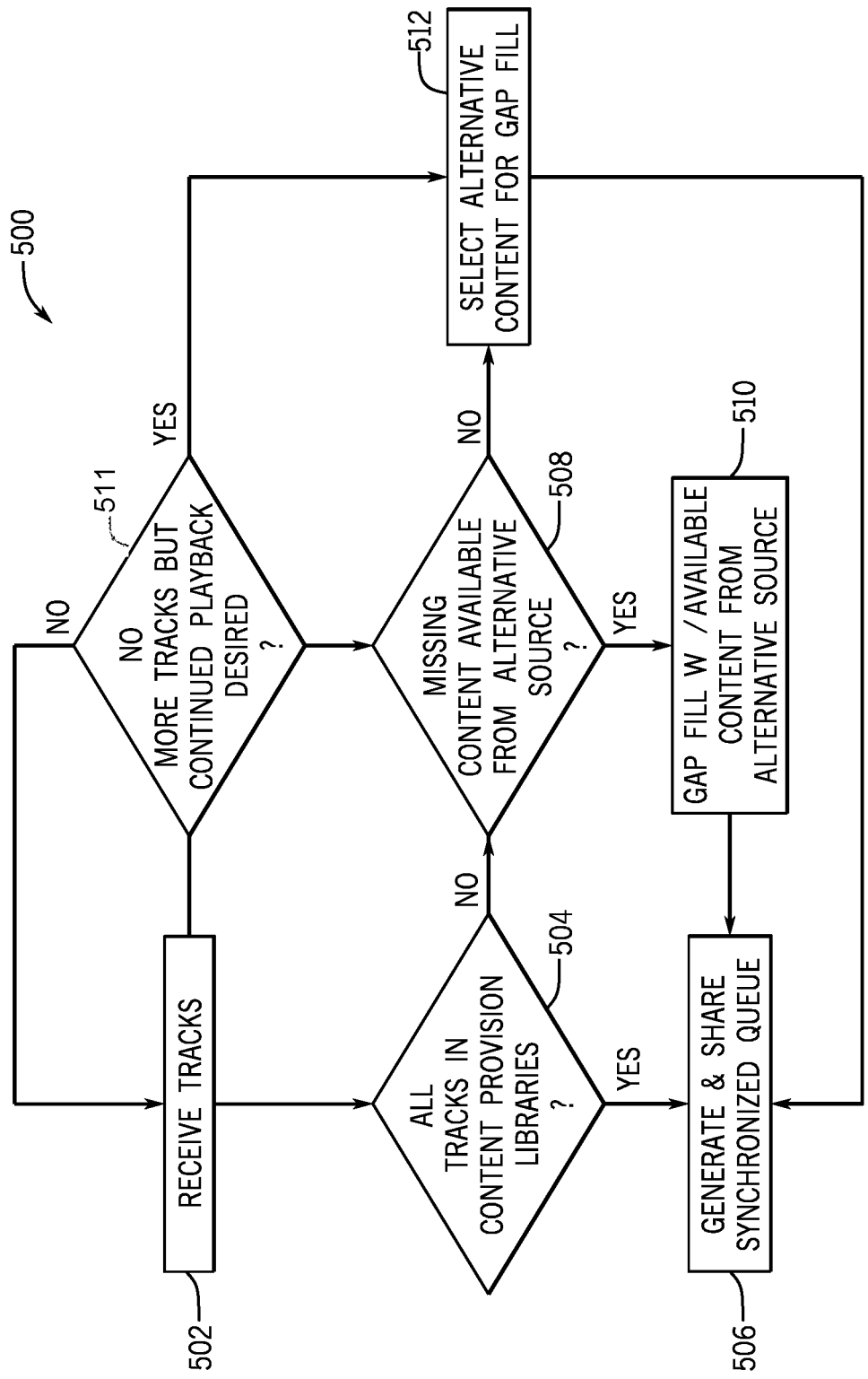
FIG. 18 is a flowchart, illustrating a process for facilitating gap-filling in the synchronized shared playlists, in accordance with one or more embodiments of the present disclosure.

In some situations, certain content in a shared playlist may not be available for all listening client devices. For example, content libraries that provide the content in the shared playlists may include certain restrictions of geographies where the content may be provided and/or otherwise may not include content referenced in the shared playlist. Further, some devices may have content restrictions enabled, such as a restriction from playing explicit content. Additionally or alternatively, sometimes shared playlists may go dormant, for a time, at the source, resulting in a lack of continuous content being provided to the listening client devices. For example, a user, Alice, may broadcast/share her playback live, but stop broadcasting/sharing for a temporal period of time. In such situations, it may be useful to gap-fill portions of a shared playlist. For example FIG. 17 is a schematic diagram of a system 450 where the cloud-based queue synchronization service 62 includes gap-filling logic 452 for gap-filling missing/unavailable content indicators in the playlist and/or missing/unavailable content that is indicated the playlist, in accordance with one or more embodiments of the present disclosure. Further, FIG. 18 is a flowchart, illustrating a process 500 for facilitating gap-filling in the synchronized shared playlists, in accordance with one or more embodiments of the present disclosure. For clarity, these figures will be discussed together.

To perform the gap-filling, the gap-fill logic 452 may first receive an indication of all of the tracks in the shared playlist (block 502). This indication is a list of all of the tracks 454 that are currently in the source client queue 456. For example, in FIG. 17, the list includes tracks A, B, C, and D.

Then, a determination (decision block 504) is made as to whether all of the tracks 454 are in libraries of the content provisioning services 74 that are available to the listening client device 72. The content provisioning services 74 may include content libraries that store content that can be provided to listening client devices 72. In some embodiments, such as the one depicted in FIG. 17, these libraries may be geography-specific libraries 460 that dictate particular geographies that have access to content stored therein) to the listening client devices 72. In such scenarios the content stored in these geography-specific libraries 460 is only available for a particular set of geographies and not for geographies outside of the particular set of geographies. Further, in embodiments, where the listening client devices 72 are restricted to playback of non-explicit content, tracks 454 of explicit content are not available to listening client device 72.

If all of the tracks are available via the content provisioning services 74, the synchronized shared playlist is generated and shared as described above (block 506), as no gap-filling of content is necessary.

If not all of the tracks are available via the content provision services 74 for the listening client device 72, a determination (decision block 508) is made as to whether the unavailable tracks are available from an alternative source. For example, the alternative sources may include the source content storage 458 and/or the source client 66. The source content storage 458 may store uploaded content provided by the source client 66 (e.g., to facilitate sharing of the shared playlist to the listening client devices 72). In some cases, the source client 66 may directly send content to the listening client device 72. However, in embodiments where the listening client device 72 is restricted from playback of the unavailable content, the content will not be available from an alternative source.

Turning to the example in FIG. 17, the hatch marching over Track C in the source client queue 456 indicates that Track C is not available from the content provisioning services 74 or from an alternative source. The hatch marching over Track D in the source client queue 456 indicates that Track D is not available from the content provisioning services 74, but is available from an alternative source.

If all of the missing content is available from an alternative source (e.g., via the source content storage or the source client device 72), the gap-fill logic 452 may gap-fill the missing content with the content available from the alternative sources (e.g., the source content storage 458 and/or the source client 66) (block 510) and the playlist can be generated and shared using content from the alternative sources (block 506).

In the example of FIG. 17, Track D content 462 can be sourced from the source client 66 and thus is added to the listening client queue 464. However, Track C is not available from the alternative sources, so it is not added to the listening client queue 464.

From time to time, it may be desirable to select alternative content that is not in the playlist for gap-fill (block 512). For example, when the missing content is not available from an alternative source as determined in decision block 508 or when there are no more tracks in the playlist but continued playback at the listening client devices 72 is desirable (as determined by decision block 511), the alternative content gap-fill content may be selected (block 512) and the playlist can be generated and shared using the alternative content selected in block 512. The alternative content can be selected based upon a number of factors. For example, the alternative content can be another version of the track, such as a live recorded version or a re-mixed version of a recorded track. The alternative content can be content that closely matches a time length of the original track or content with a shortened time length with added blank content to match the original track length (e.g., to maintain the synchronization). Further, the alternative content can be content that matches a genre of the original track and/or is otherwise associated or has an affinity with the original track. In embodiments where the digital content was not available due to restrictions of the listening client devices 72, the alternative content may be an edited version of the unavailable digital content (e.g., an explicit lyrics track edited to obfuscate the explicit lyrics).

Returning to the example of FIG. 17, Track C is not available from the content provisioning services 74 or the alternative sources. Accordingly, alternative content can be used to gap-fill the missing track. Here, Track C' replaces Track C in the listening client queue 464, resulting in a complete queue of available content.

Synchronized Shared Playlist Environments

The discussion now turns to particular environments where the synchronized shared playlist functionality may be used. This discussion is not meant to limit the use of synchronized shared playlists to these environments, but instead is meant to facilitate discussion of uses of these features. Indeed, these features could be used in any number of environments.

Figure 19:
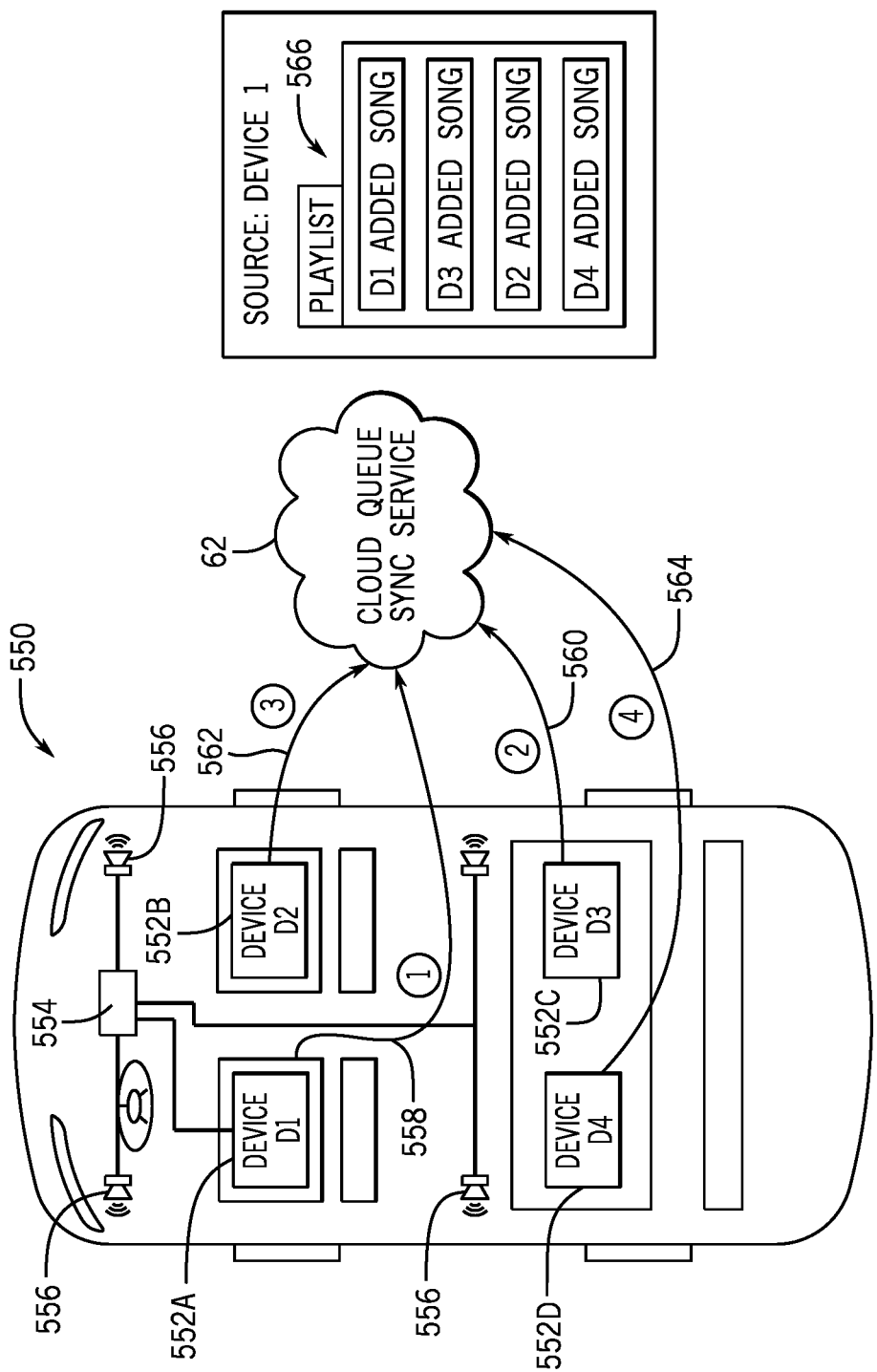
FIG. 19 is a schematic diagram, illustrating a shared playlist generation application, in accordance with one or more embodiments of the present disclosure.

On a road trip, multiple occupants are in a typically in a vehicle listening to a common playlist of an electronic device connected to the vehicle's head unit. However, this may result in all occupants being subjected to the content preferences of a single user (e.g., the user that controls the device connected to the head unit). Using the synchronized editing feature of the synchronized shared playlists, users can now submit their own edits to a currently playing playlist, such that everyone is allotted a portion of the listening time. FIG. 19 is a schematic diagram, illustrating a shared playlist used in a vehicle 550, in accordance with one or more embodiments of the present disclosure.

Similar to traditional playlist streaming within a vehicle, an electronic device (e.g., electronic device 552A) that is playing back the playlist (e.g., the synchronized shared playlist) is communicatively coupled to the vehicle's head unit 554, such that the playback can be provided by the head unit 554 to the vehicle's speakers 556.

The playlist may be a synchronized shared playlist as described herein. Further, in some embodiments, the cloud-based queue synchronization service may reside as part of the head unit or on the device 552A presenting the playlist. In other embodiments, an Internet connection may be used to connect with a network cloud service that provides this functionality.

As previously discussed, playlist editing permissions may allow playlist changes to be implemented by other electronic devices. For example, the head unit 554 or a graphical user interface (GUI) may enable electronic device 552 to enable playlist editing rights to electronic device 552B, 552C, and 552D. As illustrated, electronic device "D1" 552A first provides the playlist, illustrated by arrow 558. Then, electronic device "D3" 552C provides an update to add a new track to the playlist, illustrated by arrow 560. Next, electronic device "D2" 552B provides an update to add a new track to the playlist, illustrated by arrow 562. Last, electronic device "D4" provides an update to add a new track to the playlist, illustrated by arrow 564. As illustrated in the resultant playlist 566, each of the tracks are added in order of provision. In some embodiments, tracks are placed in a first-come-first-serve manner. However, in other embodiments, tracks can be added at any position in the playlist. Further, tracks can be removed, duplicated, etc. Additionally, in some embodiments, if the proper permissions are provided by the playlist owner, the other electronic devices may alter playback, such as pause, skip, seek, etc. Thus, the synchronized shared playlist features provide enhanced playlist editing and control not seen before.

Figure 20:
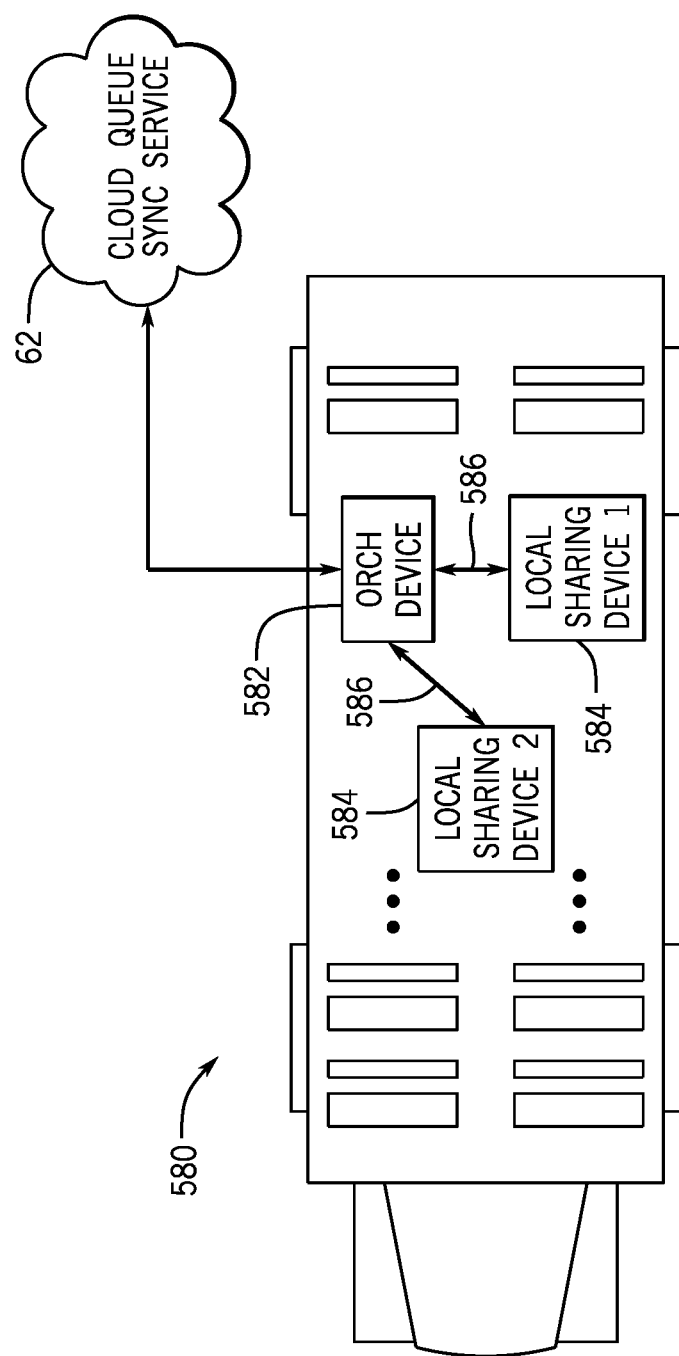
FIG. 20 is a schematic diagram, illustrating a localized sharing orchestration application, in accordance with one or more embodiments of the present disclosure.

Turning now to a passenger bus example, FIG. 20 is a schematic diagram, illustrating a localized sharing orchestration useful for synchronized shared playlists in a proximate location, in accordance with one or more embodiments of the present disclosure. Oftentimes, people in a proximate location desire to share digital content with one another, but have limited means to do so without interrupting other people in the proximate location.

FIG. 20 illustrates a passenger bus 580 as an example of a proximate location of individuals who desire to enjoy synchronized playback of content. In such a scenario, the cloud-based queue synchronization service 62 may provide synchronized playback to multiple devices. In some embodiments, especially in embodiments where electronic devices can communicate over lower-range communications, such as Wi-Fi or Bluetooth, the cloud-based queue synchronization service 62 may elect an orchestration device 582, which can act as a localized surrogate of the cloud-based synchronization service 62 that facilitates each of the synchronization services for the cloud-based queue synchronization service 62. In other words, the local orchestration device 582, in essence, becomes the cloud-based queue synchronization service 62. For example, the orchestration device 582 may receive playlist sharing requests, generate shared playlists, and provide the shared playlists and playlist contexts to local sharing devices 584 via a direct communications channel between the orchestration device 582 and the localized sharing devices 584 (represented by arrows 586). Accordingly, in such embodiments, synchronized shared playlist functionality can be facilitated with little to no interaction with the cloud-based queue synchronization service, instead relying on the local orchestration device 582 to facilitate requests.

Figure 21:
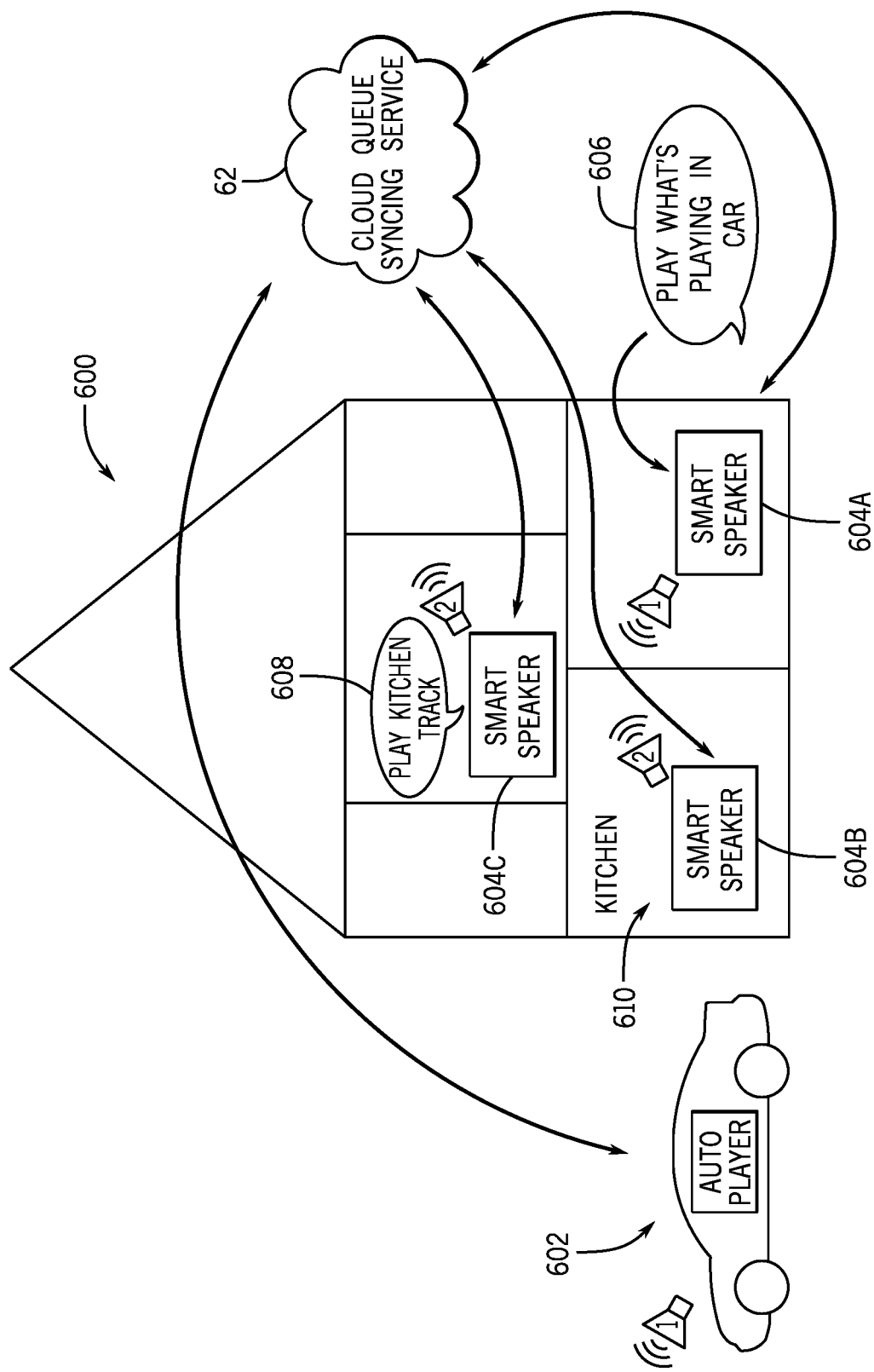
FIG. 21 is a schematic diagram, illustrating a multi-location synchronized shared playlist playback, in accordance with one or more embodiments of the present disclosure.

FIG. 21 is a schematic diagram, illustrating another environmental example use of the synchronized shared playlist functionality, this time illustrating multi-location synchronized shared playlist playback within a home 600 and vehicle 602, in accordance with one or more embodiments of the present disclosure.

As illustrated, the vehicle 602 and smart speakers 604A, 604B, and 604C are each communicatively coupled to the cloud-based queue synchronization services 62. Accordingly, using the synchronized shared playlist feature described herein, devices in one location can have synchronized playback with other devices in different locations. For instance, a voice command 606 provided to smart speaker 604A to "play what's playing in the car" may result in the smart speaker 604A requesting a synchronized shared playlist from the vehicle 602 from the cloud-based queue synchronizing service 62. The cloud-based queue synchronizing service 62 may then request a playlist and context from the vehicle 602 and upon receipt provide the playlist and a queue context for the smart speaker 604A to ensure that the speaker is playing a track synchronized with the playback track and position of the vehicle 602. As an alternative to a command identifying a playback device (e.g., the vehicle 602), a command may identify a location where a playback device is located. For example, command 608 provided to the smart speaker 604C requesting the smart speaker 604C to "play kitchen tracks" may result in the cloud-based queue synchronizing service 62 providing a playlist and queue context that synchronizes playback of the smart speaker 604C with the smart speaker 604B located or otherwise associated with the kitchen 610.

Figure 22:
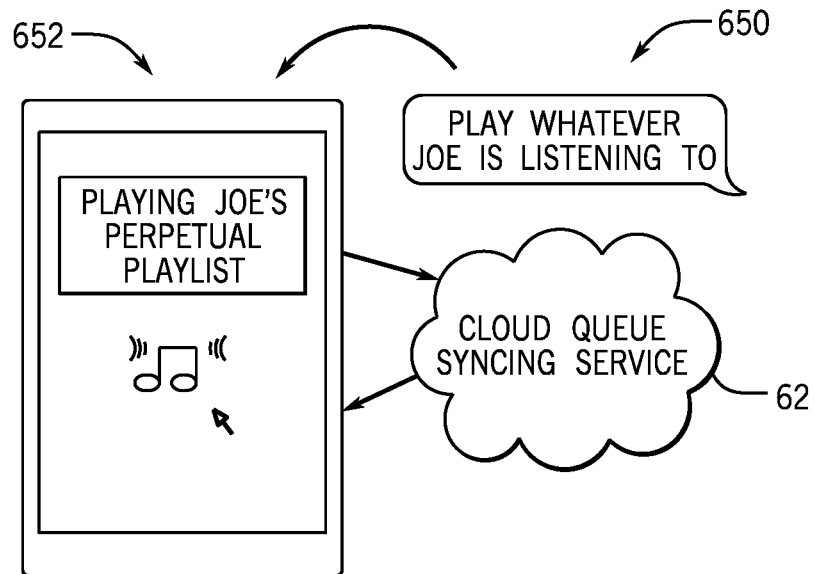
FIG. 22 is a schematic diagram, illustrating a perpetual synchronized shared playlist, in accordance with one or more embodiments of the present disclosure.

In some embodiments, a perpetual playlist may be provided for use. The perpetual playlist is a playlist that does not end, even if all of the tracks are played back. FIG. 22 is a schematic diagram, illustrating a request 650 that provides a perpetual synchronized shared playlist, in accordance with one or more embodiments of the present disclosure. In the illustrated embodiment, the request 650 requests the device 652 to "play whatever Joe is listening to." The cloud-based queue synchronization service may generate a playlist based upon the current playlist and playback time on Joe's device. If Joe's device is not playing content at a particular time, in some embodiments, the gap-filling techniques may be used to either provide content Joe would likely listen to or provide blank content or another content indicative of no playback currently on Joe's device.

Figure 23:
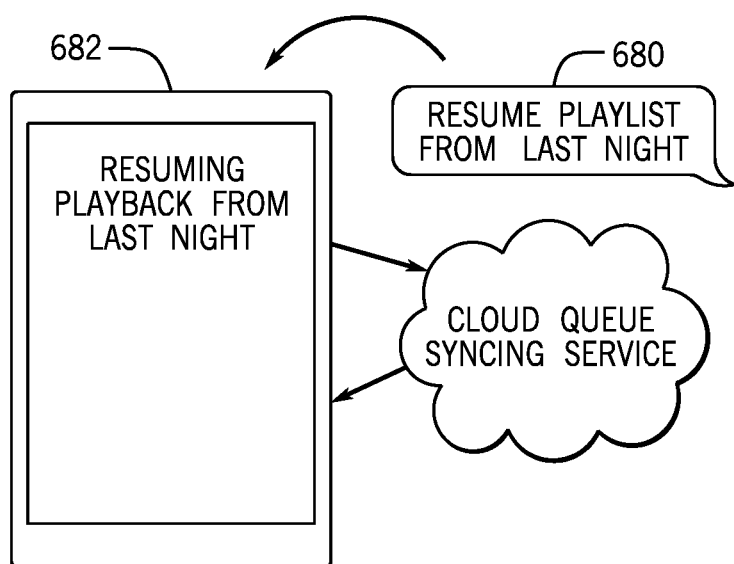
FIG. 23 is a schematic diagram, illustrating a historical synchronized shared playlist, in accordance with one or more embodiments of the present disclosure.

In some embodiments, historical playlists may be played back. FIG. 23 is a schematic diagram, illustrating a historical synchronized shared playlist request 680, in accordance with one or more embodiments of the present disclosure. The request 680 requests device 682 to "resume playlist from last night." The device 682 may send a request to the cloud-based queue synchronization service 62 to resume playlists during the evening hours of yesterday, based upon this request. If multiple playlists were played in the evening hours of yesterday, the cloud-based queue synchronization service 62 may provide an indication of the multiple playlists and allow the device to select one of the multiple playlists (e.g., via a voice or graphical user interface (GUI) command). Based upon the selection, the cloud-based queue synchronization service 62 may facilitate playback of a historical playlist by the device 682.

As may be appreciated, the cloud-based queue synchronization service 62 may provide many benefits to digital content enjoyment and playlist editing. The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

As described above, one aspect of the present technology is the gathering and use of data available from various sources to facilitate synchronized shared playback of content between client devices. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver synchronized shared content between users. Accordingly, use of such personal information data enables calculated synchronized sharing between electronic devices. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of synchronized shared playback of digital content, the present technology can be configured to allow users to select to "opt in" or "opt out" of participation in the collection of personal information data during registration for services or anytime thereafter. In another example, users can select to limit the length of time shared playlist data is maintained or entirely prohibit generation and/or sharing of such information. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, synchronized shared playback content can be selected and delivered to users by inferring preferences based on non-personal information data or a bare minimum amount of personal information, such as the content being requested by the device associated with a user, other non-personal information available to the content provisioning services and/or cloud queue synchronization service, or publicly available information.

What is claimed is:

1. A computer-implemented method, comprising:
   causing, via a content presentation service, playback of a digital content stream via a playback device, in response to a command from a first electronic device coupled to the content presentation service;
   receiving a second command to alter the playback of the digital content stream from a second electronic device different than the first electronic device; and
   altering the playback of the digital content stream in accordance with the second command, wherein the playback device performs the playback of the digital content stream for both a first user of the first electronic device and a second user of the second electronic device.

2. The computer-implemented method of claim 1, comprising:
   determining whether the second electronic device is authorized to edit the playback of the digital content stream; and
   altering the playback of the digital content stream in accordance with the second command only when the second electronic device is authorized to edit the playback of the digital content stream.

3. The computer-implemented method of claim 1, wherein the content presentation service comprises an application executing on the first electronic device.

4. The computer-implemented method of claim 1, wherein the content presentation service comprises a service remote from the first electronic device that is configured to provide at least a portion of the digital content stream.

5. The computer-implemented method of claim 1, wherein the second command to alter the playback of the digital content stream comprises a command to add new content to the digital content stream.

6. The computer-implemented method of claim 5, wherein the new content is added in a first-come-first serve manner where the new content is caused to be played back at a time later than digital content submitted for playback in the digital content stream prior to the new content.

7. The computer-implemented method of claim 5, wherein the command to add new content to the digital content stream comprises a location indication where the new content should be played back; and
   the computer-implemented method comprises causing playback of the new content in the digital content stream at the location.

8. The computer-implemented method of claim 1, wherein the second command to alter the playback of the digital content stream comprises a command to remove, duplicate, or both content from the digital content stream.

9. The computer-implemented method of claim 1, wherein the second command to alter the playback of the digital content stream comprises a command to pause, skip, seek, or any combination within the playback of the digital content stream.

10. The computer-implemented method of claim 1, wherein the playback of the digital content stream is performed via a head unit.

11. The computer-implemented method of claim 10, wherein the head unit provides output to both the first user of the first electronic device and the second user of the second electronic device.

12. A tangible, non-transitory, computer-readable medium, comprising computer-readable instructions, that when executed by one or more processors of one or more computers, cause the one or more computers to:
   cause, via a content presentation service, playback of a digital content stream via a playback device, in response to a command from a first electronic device coupled to the content presentation service;
   receive a second command to alter the playback of the digital content stream from a second electronic device different than the first electronic device; and
   alter the playback of the digital content stream in accordance with the second command, wherein the playback device performs the playback of the digital content stream for both a first user of the first electronic device and a second user of the second electronic device.

13. The tangible, non-transitory computer-readable medium of claim 12, comprising computer-readable instructions, that when executed by the one or more processors of the one or more computers, cause the one or more computers to:
   determine whether the second electronic device is authorized to edit the playback of the digital content stream; and
   alter the playback of the digital content stream in accordance with the second command only when the second electronic device is authorized to edit the playback of the digital content stream.

14. The tangible, non-transitory computer-readable medium of claim 12, wherein the content presentation service comprises an application executing on the first electronic device, an application executing on a head unit that provides the playback, a service remote from the first electronic device that is configured to provide at least a portion of the digital content stream, or any combination thereof.

15. The tangible, non-transitory computer-readable medium of claim 12, wherein the second command to alter the playback of the digital content stream comprises a command to add new content to the digital content stream.

16. The tangible, non-transitory computer-readable medium of claim 15, wherein the new content is added in a first-come-first serve manner where the new content is caused to be played back at a time later than digital content submitted for playback in the digital content stream prior to the new content.

17. The tangible, non-transitory computer-readable medium of claim 15, wherein the command to add new content to the digital content stream comprises a location indication where the new content should be played back; and
   the tangible, non-transitory computer-readable medium comprises computer-readable instructions, that when executed by the one or more processors of the one or more computers, cause the one or more computers to cause playback of the new content in the digital content stream at the location.

18. The tangible, non-transitory computer-readable medium of claim 12, wherein the second command to alter the playback of the digital content stream comprises:
   a command to remove, duplicate, or both content from the digital content stream;
   a command to pause, skip, seek, or any combination within the playback of the digital content stream; or
   any combination thereof.

19. The tangible, non-transitory computer-readable medium of claim 12, wherein the playback of the digital content stream is performed via a head unit.

20. The tangible, non-transitory computer-readable medium of claim 19, wherein the head unit provides output to both the first user of the first electronic device and the second user of the second electronic device.

* * * * *